US011706611B2

United States Patent
Xiao et al.

(10) Patent No.: US 11,706,611 B2
(45) Date of Patent: Jul. 18, 2023

(54) METHOD FOR REPORTING MULTI-CONNECTION TRANSMISSION CAPABILITY, METHOD FOR CONFIGURING MULTI-CONNECTION TRANSMISSION MODE, METHOD FOR PREVENTING RETRANSMISSION OF DATA, UE AND BASE STATION

(71) Applicant: SHARP KABUSHIKI KAISHA, Sakai (JP)

(72) Inventors: Fangying Xiao, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/475,069

(22) PCT Filed: Dec. 19, 2017

(86) PCT No.: PCT/CN2017/117186
§ 371 (c)(1),
(2) Date: Jun. 28, 2019

(87) PCT Pub. No.: WO2018/121347
PCT Pub. Date: Jul. 5, 2018

(65) Prior Publication Data
US 2019/0327607 A1    Oct. 24, 2019

(30) Foreign Application Priority Data
Dec. 30, 2016  (CN) .......................... 201611271047.7

(51) Int. Cl.
*H04W 8/24*     (2009.01)
*H04W 76/15*    (2018.01)
(Continued)

(52) U.S. Cl.
CPC ............. *H04W 8/24* (2013.01); *H04W 28/16* (2013.01); *H04W 72/51* (2023.01); *H04W 76/15* (2018.02)

(58) Field of Classification Search
CPC ....... H04W 76/15; H04W 8/24; H04W 28/16; H04W 72/51; H04W 76/00; H04L 5/0053; H04L 5/0098; H04L 5/001
See application file for complete search history.

(56) References Cited

U.S. PATENT DOCUMENTS

2016/0242193 A1    8/2016  Hong et al.
2016/0255675 A1    9/2016  Van Lieshout et al.
(Continued)

FOREIGN PATENT DOCUMENTS

CN      1838816 A        9/2006
WO      2016/163432 A1   10/2016

OTHER PUBLICATIONS

Written Opinion of the International Searching Authority for PCT/CN2017/117186, dated Mar. 15, 2018 (English Translation is attached).
(Continued)

*Primary Examiner* — Omer S Mian
(74) *Attorney, Agent, or Firm* — ScienBiziP, P.C.

(57) ABSTRACT

The present disclosure provides a method for reporting multi-connection transmission capability, a method for configuring multi-connection transmission modes, a method for preventing retransmission of data, and corresponding user equipment and a base station which support multi-connection transmission. The method for reporting a multi-connection transmission capability comprises: receiving, from a base station, a UE capability query message, the UE capability query message being used to request the UE to send a wireless access capability of the UE for accessing an access network; generating a UE capability information message in response to the received UE capability query message, the (Continued)

UE capability information message being used to indicate the wireless access capability of the UE for accessing the access network and comprising bearer types and/or transmission manners supported by the UE; and sending to the base station the UE capability information message.

3 Claims, 18 Drawing Sheets

(51) Int. Cl.
*H04W 28/16* (2009.01)
*H04W 72/51* (2023.01)

(56) References Cited

U.S. PATENT DOCUMENTS

| | | | |
|---|---|---|---|
| 2016/0302075 A1* | 10/2016 | Dudda | H04W 12/1006 |
| 2018/0035483 A1* | 2/2018 | Nagasaka | H04W 28/085 |
| 2019/0098606 A1* | 3/2019 | Sharma | H04B 7/0404 |
| 2020/0053715 A1* | 2/2020 | Jang | H04W 76/14 |
| 2020/0304252 A1* | 9/2020 | Shim | H04L 5/0091 |

OTHER PUBLICATIONS

NTT Docomo: "New SID Proposal: Study on New Radio Access Technology", RP-160671, 3GPP TSG RAN Meeting #71, Goteborg, Sweden, 7.-10. Mar. 2016.

\* cited by examiner

METHOD FOR REPORTING MULTI-CONNECTION TRANSMISSION CAPABILITY, METHOD FOR CONFIGURING MULTI-CONNECTION TRANSMISSION MODE, METHOD FOR PREVENTING RETRANSMISSION OF DATA, UE AND BASE STATION

TECHNICAL FIELD

The present disclosure relates to the technical field of wireless communications; and in particular, the present disclosure relates to a method for reporting a multi-connection transmission capability, a method for configuring a multi-connection transmission manner, a method for preventing sending successfully-received data, and corresponding user equipment and a base station which support multi-connection transmission.

BACKGROUND

A new research project on 5th Generation (5G) technical standards (see non-patent literature: RP-160671: New SID Proposal: Study on New Radio Access Technology) was proposed by NTT DOCOMO in the 3rd Generation Partnership Project (3GPP) RAN #71 plenary session held in March 2016, and was approved. The goal of the research project is to develop a New Radio (NR) access technology to meet all of the application scenarios, requirements, and deployment environments of 5G. NR mainly has three application scenarios: enhanced Mobile Broadband Communication (eMBB), massive Machine Type Communication (mMTC), and Ultra Reliable and Low Latency Communication (URLLC).

In the 3GPP RAN2 #96 meeting, it was agreed that research will be performed on multi-connection (including dual-connection) so as to satisfy the reliability requirement of the URLLC.

However, problems involved in the multi-connection transmission include: how to report, by user equipment (UE), a multi-connection transmission capability supported by the UE, how a base station (for example, a gNB or 5G radio access network (5G-RAN), or an eNB or evolved universal terrestrial radio access network (E-UTRAN)) configures for the UE a multi-connection transmission manner, and how to prevent a sending party (which can be a UE or a base station) from sending data that has been successfully received by a receiving party (which can be a base station or a UE) (that is, retransmission of data transmission), all of which are issues that need to be addressed urgently.

SUMMARY

The present disclosure aims at solving the above-mentioned problems involved in the multi-connection transmission, including: how to report, by UE, a multi-connection transmission capability supported by the UE, how a base station (for example, a gNB or 5G radio access network (5G-RAN), or an eNB or evolved universal terrestrial radio access network (E-UTRAN)) configures for the UE a multi-connection transmission manner, and how to prevent a sending party (which can be a UE or a base station) from sending data that has been successfully received by a receiving party (which can be a base station or a UE).

According to one aspect of the present disclosure, a method executed at user equipment (UE) supporting multi-connection transmission is provided, comprising: receiving, from a base station, a UE capability query message, the UE capability query message being used to request the UE to send a wireless access capability of the UE for accessing an access network; generating a UE capability information message in response to the received UE capability query message, the UE capability information message being used to indicate the wireless access capability of the UE for accessing the access network and comprising bearer types and/or transmission manners supported by the UE; and sending to the base station the UE capability information message.

According to another aspect of the present disclosure, a method executed at a base station supporting multi-connection transmission is provided, comprising: sending to user equipment (UE) a UE capability query message, the UE capability query message being used to request the UE to send a wireless access capability of the UE for accessing an access network; receiving, from the UE, a UE capability information message, the UE capability information message being used to indicate the wireless access capability of the UE for accessing the access network and comprising bearer types and/or transmission manners supported by the UE; and configuring for the UE a bearer type and/or transmission manner used for multi-connection transmission according to the UE capability information message.

According to another aspect of the present disclosure, user equipment (UE) is provided, comprising:
a transceiver, used to receive, from a base station, a UE capability query message, the UE capability query message being used to request the UE to send a wireless access capability of the UE for accessing an access network; and
a generation unit, used to generate a UE capability information message in response to the received UE capability query message, the UE capability information message being used to indicate the wireless access capability of the UE for accessing the access network and comprising bearer types and/or transmission manners supported by the UE;
the transceiver is further used to send to the base station the UE capability information message.

According to another aspect of the present disclosure, a base station is provided, comprising:
a transceiver, used to send to user equipment (UE) a UE capability query message, the UE capability query message being used to request the UE to send a wireless access capability of the UE for accessing an access network, and receive, from the UE, a UE capability information message, the UE capability information message being used to indicate the wireless access capability of the UE for accessing the access network and comprising bearer types and/or transmission manners supported by the UE; and
a configuration unit, used to configure for the UE a bearer type and/or transmission manner used for multi-connection transmission according to the UE capability information message.

In an exemplary embodiment, the bearer types supported by the UE comprise at least one of the following: a split bearer and a secondary cell group SCG bearer; and the transmission manners supported by the UE comprise at least one of the following: data duplication and link selection.

In an exemplary embodiment, the bearer type and/or transmission manner supported by the UE are indicated by at least one information element, wherein
each information element indicates whether the UE supports one of the following combinations of the bearer types and the transmission manners: split bearer with data duplication; split bearer with link selection; SCG bearer with data duplication; and SCG bearer with link selection; or each information element corresponds to one bearer type and is used to indicate whether the corresponding bearer type supports the data duplication or the link selection; or each information element corresponds to one transmission manner and is used to indicate whether the corresponding transmission manner supports the split bearer or the SCG bearer; or two information elements correspond to one bearer type and are respectively used to indicate the data duplication or the link selection supported by the corresponding bearer type; or two information elements correspond to one transmission manner and are respectively used to indicate the split bearer or the SCG bearer supported by the corresponding transmission manner.

According to another aspect of the present disclosure, a method executed at user equipment (UE) supporting multi-connection transmission is provided, the method comprising: receiving, from a base station, a radio resource control (RRC) connection reconfiguration message, the RRC connection reconfiguration message being used to modify an RRC connection and comprising bearer types and/or transmission manners the base station configures for the UE; performing an RRC connection reconfiguration according to the received RRC connection reconfiguration message, the RRC connection reconfiguration comprising configuring the bearer type and/or transmission manner the UE uses for multi-connection transmission; and sending to the base station an RRC connection reconfiguration completed message, the RRC connection reconfiguration completed message being used to confirm a success of the RRC connection reconfiguration.

According to another aspect of the present disclosure, a method executed at a base station supporting multi-connection transmission is provided, the method comprising: configuring for user equipment (UE) a bearer type and/or transmission manner used for multi-connection transmission; sending to the UE a radio resource control (RRC) connection reconfiguration message, the RRC connection reconfiguration message being used to modify an RRC connection and comprising the configured bearer type and/or transmission manner; receiving, from the UE, an RRC connection reconfiguration completed message, the RRC connection reconfiguration completed message being used to confirm a success of an RRC connection reconfiguration.

According to another aspect of the present disclosure, user equipment (UE) is provided, comprising:

a transceiver, used to receive, from a base station, a radio resource control (RRC) connection reconfiguration message, the RRC connection reconfiguration message being used to modify an RRC connection and comprising bearer types and/or transmission manners the base station configures for the UE; and a configuration unit, used to perform an RRC connection reconfiguration according to the received RRC connection reconfiguration message, the RRC connection reconfiguration comprising configuring the bearer type and/or transmission manner the UE uses for multi-connection transmission;

the transceiver is further used to send to the base station an RRC connection reconfiguration completed message, the RRC connection reconfiguration completed message being used to confirm a success of the RRC connection reconfiguration.

According to another aspect of the present disclosure, a base station is provided, comprising:

a configuration unit, used to configure for user equipment (UE) a bearer type and/or transmission manner used for multi-connection transmission; and a transceiver, used to send to the UE a radio resource control (RRC) connection reconfiguration message, the RRC connection reconfiguration message being used to modify an RRC connection and comprising the configured bearer type and/or transmission manner, and receive, from the UE, an RRC connection reconfiguration completed message, the RRC connection reconfiguration completed message being used to confirm a success of an RRC connection reconfiguration.

In an exemplary embodiment, the RRC connection reconfiguration message comprises at least one of the following combinations of the bearer types and the transmission manners: split bearer with data duplication; split bearer with link selection; SCG bearer with data duplication; and SCG bearer with link selection; or the RRC connection reconfiguration message comprises at least one bearer type and an information element used to indicate whether the corresponding bearer type supports the data duplication or the link selection; or the RRC connection reconfiguration message comprises at least one transmission manner and an information element used to indicate whether the corresponding transmission manner supports the split bearer or the SCG bearer; or the RRC connection reconfiguration message comprises at least one bearer type and an information element used to indicate whether the configured at least one bearer type supports the data duplication or the link selection; or the RRC connection reconfiguration message comprises at least one transmission manner and an information element used to indicate whether the configured at least one transmission manner supports the split bearer or the SCG bearer.

According to another aspect of the present disclosure, a method executed by user equipment (UE) in a data duplicate multi-connection transmission manner is provided, the method comprising: encapsulating at least one Packet Data Convergence Protocol (PDCP) service data unit (SDU) into a PDCP protocol data unit (PDU) through a PDCP entity and submitting the PDCP SDU to at least one lower layer entity associated with the PDCP entity; and discarding the successfully delivered PDCP SDU and the PDCP PDU corresponding thereto when the PDCP entity receives, from the at least one lower layer entity, a confirmation notification that the PDCP SDU is delivered successfully.

In an exemplary embodiment, the method further comprises: if the corresponding PDCP PDU is submitted to at least one other lower layer entity in the at least one lower layer entity, indicating the at least one other lower layer entity to discard the corresponding PDCP PDU through the PDCP entity.

According to another aspect of the present disclosure, user equipment (UE) is provided, comprising:

a Packet Data Convergence Protocol (PDCP) entity; and at least one lower layer entity associated with the PDCP entity, wherein the PDCP entity being used to encapsulate at least one PDCP service data unit (SDU) into a PDCP protocol data unit (PDU) and submit the PDCP SDU to the at least one lower layer entity; and discard the successfully delivered PDCP SDU and the PDCP PDU corresponding thereto when a confirmation notification that the PDCP SDU is delivered successfully is received from the at least one lower layer entity.

In an exemplary embodiment, the PDCP entity is further used to: indicate the at least one other lower layer entity to discard the corresponding PDCP PDU through the PDCP entity if the corresponding PDCP PDU is submitted to at least one other lower layer entity in the at least one lower layer entity.

According to another aspect of the present disclosure, a method executed by a base station in a data duplicate multi-connection transmission manner is provided, the method comprising: receiving, from user equipment (UE), a Packet Data Convergence Protocol (PDCP) status report, the PDCP status report being used to indicate to the base station a PDCP protocol data unit (PDU) that the UE successfully receives; and generating a downlink data transmission status indication message according to the received PDCP status report, the downlink data transmission status indication message being used to indicate to at least one other base station the PDCP PDU that the UE successfully receives; and sending to the at least one other base station the downlink data transmission status indication message.

According to another aspect of the present disclosure, a method executed by a base station in a data duplicate multi-connection transmission manner is provided, the method comprising: sending to at least one other base station a Packet Data Convergence Protocol (PDCP) protocol data unit (PDU); receiving, from the at least one other base station, a downlink data transmission status message, the downlink data transmission status message being used to indicate a maximum sequence number (SN) of PDCP PDUs received from the base station and successfully sequentially sent to the UE, an expected buffer size of a corresponding radio access bearer, a minimum expected buffer size for the UE, and an Xn-U, Xx-U, or X2-U data packet that the at least one other base station considers to be lost and excluded in a downlink data transmission status frame that the base station sends; generating a downlink data transmission status indication message according to the received downlink data transmission status message, the downlink data transmission status indication message being used to indicate to the at least one other base station that UE successfully receives the PDCP PDU; and sending to the at least one other base station the downlink data transmission status indication message.

According to another aspect of the present disclosure, a base station is provided, comprising:

a transceiver, used to receive, from user equipment (UE), a Packet Data Convergence Protocol (PDCP) status report, the PDCP status report being used to indicate to the base station a PDCP protocol data unit (PDU) that the UE successfully receives; and a generation unit, used to generate a downlink data transmission status indication message according to the received PDCP status report, the downlink data transmission status indication message being used to indicate to at least one other base station the PDCP PDU that the UE successfully receives;

the transceiver further used to send to the at least one other base station the downlink data transmission status indication message.

According to another aspect of the present disclosure, a base station is provided, comprising:

a transceiver, used to send to at least one other base station a Packet Data Convergence Protocol (PDCP) protocol data unit (PDU); receive, from the at least one other base station, a downlink data transmission status message, the downlink data transmission status message being used to indicate a maximum sequence number (SN) of PDCP PDUs received from the base station and successfully sequentially sent to the UE, an expected buffer size of a corresponding radio access bearer, a minimum expected buffer size for the UE, and an Xn-U, Xx-U, or X2-U data packet that the at least one other base station considers to be lost and excluded in a downlink data transmission status frame that the base station sends; and a generation unit used to generate a downlink data transmission status indication message according to the received downlink data transmission status message, the downlink data transmission status indication message being used to indicate to the at least one other base station that UE successfully receives the PDCP PDU;

the transceiver is further used to send to the at least one other base station the downlink data transmission status indication message.

In an exemplary embodiment, contents contained in the downlink data transmission status indication message are fields contained in the PDCP status report.

In an exemplary embodiment, the contents contained in the downlink data transmission status indication message are:

a maximum sequence number (SN) of PDCP PDUs that the UE successfully receives, and PDCP PDU SNs of all non-successfully received PDCP PDUs of which the SNs thereof are less than the maximum SN of the PDCP PDUs that the UE successfully receives; or a maximum SN of PDCP PDUs successfully that the base station successfully delivers, and PDCP PDU SNs of all non-successfully sent PDCP PDUs of which the SNs thereof are less than the maximum SN of all of the PDCP PDUs that the base station successfully delivers.

The technical solutions of the present disclosure enables the base station to configure an appropriate bearer type according to the capability of the UE, and prevents retransmission of uplink or downlink data.

DESCRIPTION OF THE DRAWINGS

The above and other features of the present disclosure will become more apparent with the following detailed description in conjunction with the accompanying drawings.

DESCRIPTION OF THE EMBODIMENTS

Figure 1:
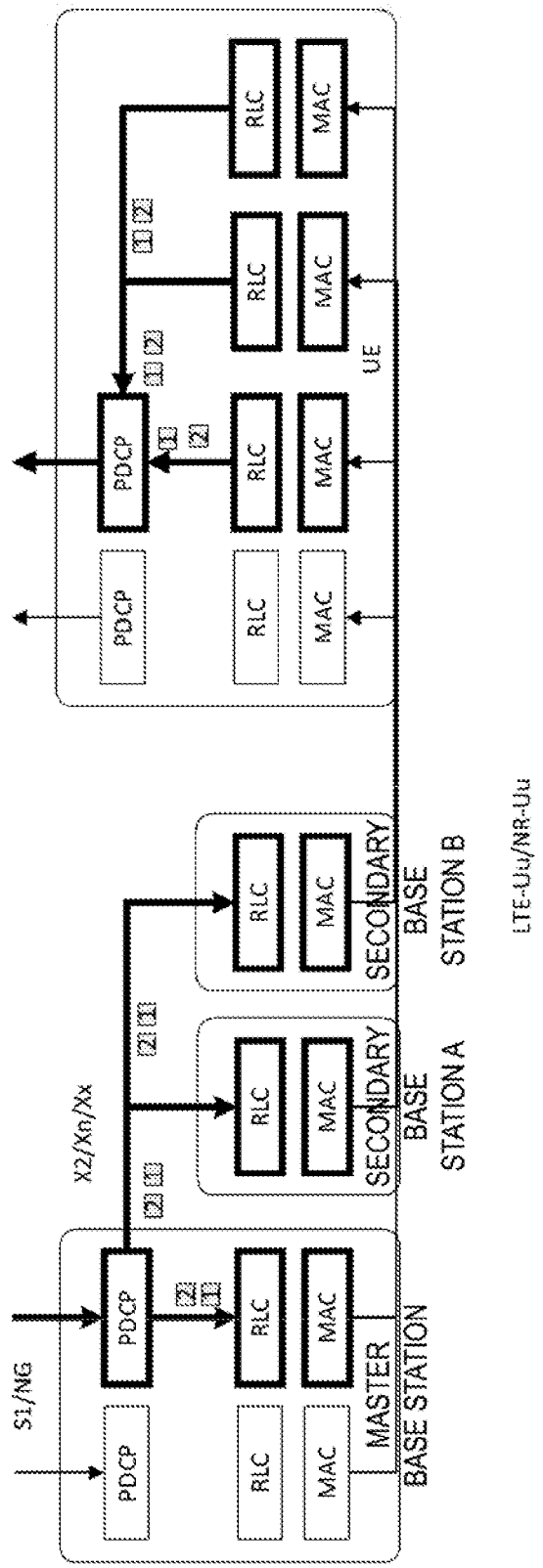
FIG. 1 illustrates a schematic diagram of downlink split bearer data duplication transmission between a base station and UE.

The present disclosure is described below in detail with reference to the accompanying drawings and specific embodiments. It should be noted that the present disclosure should not be limited to the specific embodiments described below. In addition, for simplicity, detailed description of the known art not directly related to the present disclosure is omitted to avoid obscuring the understanding of the present invention.

Some terms involved in the present disclosure are described below. If not specifically indicated, the terms involved in the present disclosure use the definitions herein.

PDCP: Packet Data Convergence Protocol.
RLC: Radio Link Control.
PDU: Protocol Data Unit.
SDU: Service Data Unit.

In the present disclosure, data received from or delivered to an upper layer is referred to as an SDU, and data delivered to or received from a lower layer is referred to as a PDU. For example, data received from or delivered to the upper layer by a PDCP entity is referred to as a PDCP SDU; data received from or delivered to the PDCP entity by an RLC entity is referred to as an RLC SDU (namely, PDCP PDU).

RRC: Radio Resource Control.
RRC_connected state: RRC_CONNECTED. UE is in the RRC_CONNECTED state after an RRC connection is established.

Split bearer: a bearer of which a wireless protocol thereof is on an MeNB and an SeNB and uses both MeNB and SeNB resources in multi-connection.

SCG bearer: a bearer of which a wireless protocol thereof is on an SeNB and uses an SeNB resource in multi-connection.

Master base station: Master eNB, denoted as MeNB (corresponding to E-UTRAN or Long Term Evolution (LTE)) or MgNB (corresponding to 5G-RAN or NR), which refers to a base station that at least terminates at a control node mobility management entity (denoted as SI-MME) for processing interaction between UE and a core network in multi-connection. In the present invention, the master base station is denoted as MeNB. It should be noted that all schemes or definitions applicable to the MeNB are likewise applicable to the MgNB.

Secondary base station: Secondary eNB, denoted as SeNB (corresponding to E-UTRAN or LTE) or SgNB (corresponding to 5G-RAN or NR), which refers to a base station that provides extra radio sources for UE and does not serve as an MeNB in multi-connection. In the present invention, the secondary base station is denoted as SeNB. It should be noted that all schemes or definitions applicable to the SeNB are likewise applicable to the SgNB.

Primary cell: Primary Cell (PCell), which refers to a cell working in a primary frequency, i.e., a cell in which UE performs an initial connection establishment process or initiates a connection re-establishment process, or a cell designated as a primary cell during a switching process.

Primary secondary cell: Primary Secondary Cell (PSCell), which refers to an SCG cell used to indicate to UE for a random access during an SCG switching process.

Secondary cell: Secondary Cell (SCell), which refers to a cell working in a secondary frequency. The cell can be configured after an RRC connection is established and can be used to provide extra radio resources.

Cell group: a group of serving cells associated with a master base station or secondary base station. It should be noted that the cell defined in the present disclosure can also be referred to as a set of beam.

Master cell group: Master Cell Group (MCG). For UE not configured with multi-connection, the MCG consists of all serving cells; for UE configured with multi-connection, the MCG consists of a subset (i.e., a group of serving cells associated with an MeNB) of serving cells and includes a PCell and 0, 1, or more SCells.

Secondary cell Group: Secondary Cell Group (SCG), which refers to a group of serving cells associated with an SeNB in multi-connection. The SCG can include one PSCell, and can further include one or a plurality of SCells.

Multi-connection: an operation mode of UE in the RRC_connected state. In the multi-connection, multiple cell groups are configured; the multiple cell groups include one MCG and one or a plurality of SCGs (that is, the UE is connected to a plurality of base stations). If only one MCG (or MeNB) and one SCG (or SeNB) are configured, the multi-connection is referred to as dual-connection. That is, the UE in the connected state and having multiple receivers and/or transmitters is configured to use E-UTRAN and/or 5G-RAN radio resources provided by multiple different schedulers; the schedulers are connected to each other by means of non-ideal backhaul. The multi-connection defined by the present disclosure includes the dual-connection. A multi-connection data transmission manner includes, but is not limited to, data duplication and link selection.

Data duplication: data transmission in serving cells of multiple CGs in a multi-connection manner; that is, the same data is sent on multiple different bearers (for example, a data radio bearer (DRB) or a signaling radio bearer (SRB)).

Split bearer data duplication: a data sending manner or bearer in multi-connection. In this sending manner, the same data is sent on multiple wireless protocols of a split bearer.

FIG. 1 illustrates a schematic diagram of downlink split bearer data duplication transmission between a base station and UE. It should be understood that uplink split bearer with data duplication transmitted between the base station and the UE can adopt the same protocol architecture, in which case data is sent from the UE to the base station and the arrow in FIG. 1 is reversed. As shown in FIG. 1, data, for example, a Packet Data Convergence Protocol protocol data unit (PDCP PDU), is sent on multiple wireless protocols (corresponding to multiple RLC entities associated with the same PDCP entity) of a split bearer by using an MeNB and one or more SeNB resources. In a PDCP PDU data duplicate multi-connection manner, each PDCP PDU is sent to a receiving party via a plurality of RLC entities. The implementations of the present disclosure can be further extended to include other data duplication manners, such as RLC PDU data duplication. An interface between the MeNB and the SeNB can be denoted as Xn, Xx, or X2. The interface can be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an LTE eNB.

SCG bearer data duplication: a data sending manner or bearer in multi-connection. In the sending manner, the same data is sent on an MCG bearer and/or multiple SCG bearers; and the same data is transmitted by using resources provided by an MeNB (or MCG) and an SeNB (or SCG).

Figure 2:
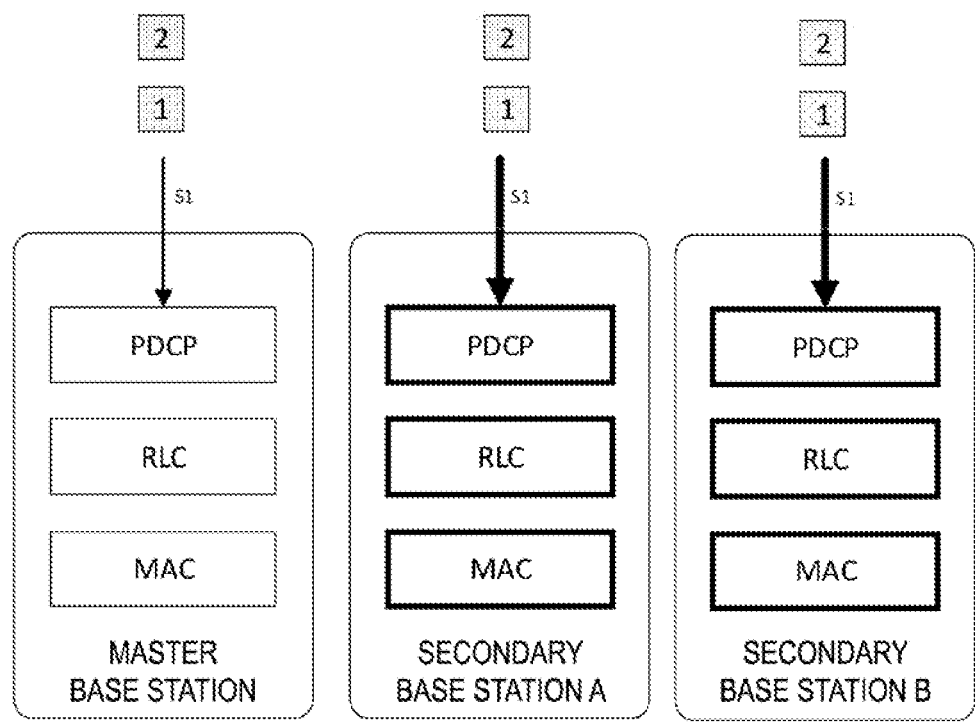
FIG. 2 illustrates a schematic diagram of downlink SCG bearer data duplication transmission at a base station.

FIG. 2 illustrates a schematic diagram of downlink SCG bearer data duplication transmission at a base station; the same data is sent on a configured MCG bearer and/or configured one or a plurality of SCG bearers. A core network (for example, a CN or a 5G-CN) sends the same data to a plurality of base stations.

Figure 3:
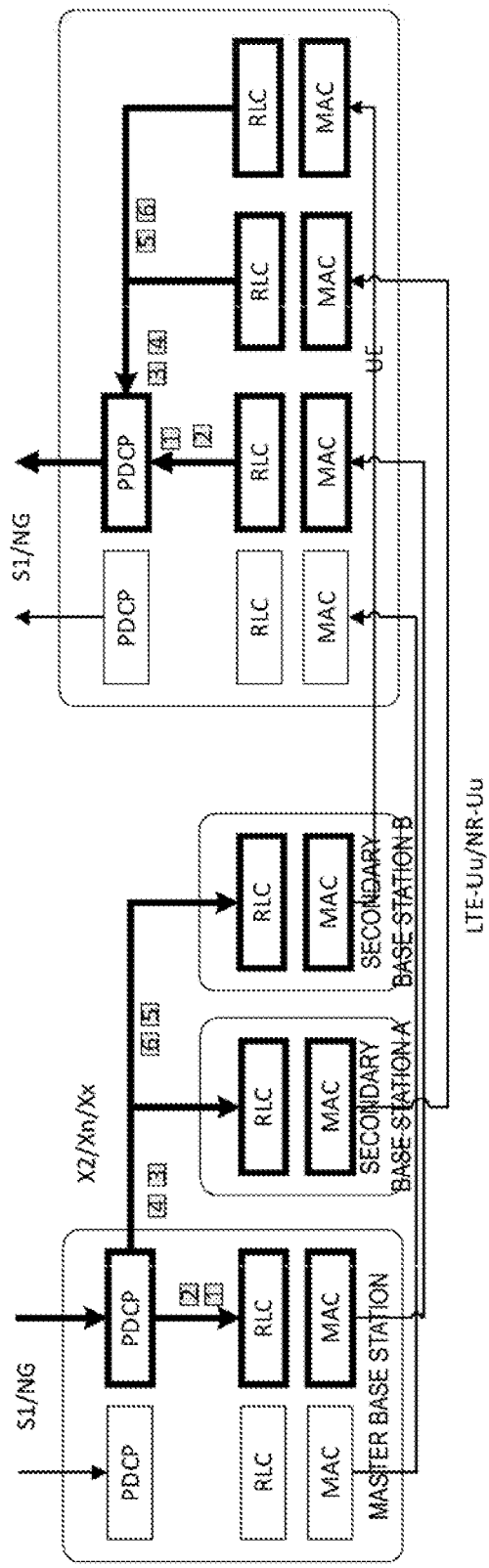
FIG. 3 illustrates a schematic diagram of downlink split bearer link selection transmission between a base station and UE.

Link selection: data transmission in a serving cell of a configured CG in multi-connection; that is, the same data is sent on only one bearer; and each piece of data only uses resources of an MeNB or an SeNB. FIG. 3 shows a schematic diagram of downlink PDCP PDU link selection (the uplink can adopt the same protocol architecture, in which case data is sent from UE to a base station). In a PDCP PDU link selection multi-connection manner, each PDCP PDU is sent to a receiving party via only one RLC entity. The implementations described herein can be further extended to include other link selection manners, such as RLC PDU link selection.

Split bearer link selection: a data sending manner or bearer in multi-connection. In the sending manner, data is transmitted by using radio resources provided by an MeNB (or MCG) and an SeNB (or SCG); that is, in each data transmission, the MeNB selects a wireless protocol on the MeNB (or MCG) and the SeNB (or SCG) for transmission.

FIG. 3 illustrates a schematic diagram of downlink split bearer link selection transmission between a base station and UE; It should be understood that uplink split bearer with link selection transmitted between the base station and the UE can adopt the same protocol architecture, in which case data is sent from the UE to the base station and the arrow in FIG. 3 is reversed. Data, for example, a PDCP PDU, is sent on a wireless protocol of a split bearer by using an MeNB or SeNB resource. In a PDCP PDU link selection multi-connection manner, each PDCP PDU is sent to a receiving party via only one RLC entity. The implementations described herein can be further extended to include other link selection manners, such as RLC PDU link selection.

SCG bearer link selection: a data sending manner or bearer in multi-connection. In the sending manner, data is transmitted by using radio resources provided by an MeNB (or MCG) or an SeNB (or SCG); that is, in each data transmission, a core network or gateway selects a wireless protocol on the MeNB (or MCG) for transmission.

Figure 4:
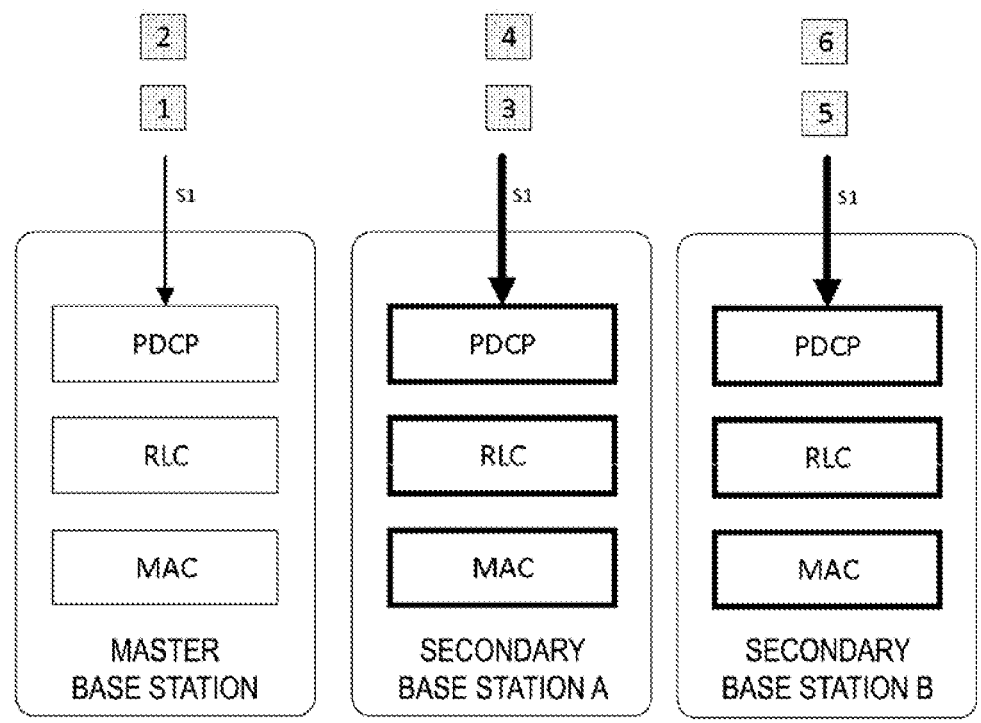
FIG. 4 illustrates a schematic diagram of downlink SCG bearer link selection transmission at a base station.

FIG. 4 illustrates a schematic diagram of downlink SCG bearer data duplication transmission at a base station; the same data is sent on a configured MCG bearer and/or a configured SCG bearer. A core network (for example, a CN or a 5G-CN) sends data to a base station (or CG); and different base stations (or CGs) send different pieces of data.

PDCP status report: the PDCP status report is used by a receiving end to report to a sending end a PDCP SDU receiving situation. The PDCP status report contains at least the following field: a field FSM used to indicate a PDCP sequence number (SN) of a first unreceived PDCP SDU and a bitmap is included if there is at least one non-sequentially received PDCP SDU; a length of the bitmap is the number of PDCP SNs counted from the first unreceived PDCP SDU to the last non-sequentially received PDCP SDU, with the first unreceived PDCP SDU being not counted and the last non-sequentially received PDCP SDU being counted. The bitmap ends when any one of the following conditions is satisfied: the bitmap length can fill up a current byte, or a size of a PDCP Control PDU including a PDCP SDU is 8188 bytes. "0" is assigned to positions corresponding to all PDCP SDUs indicated as being unreceived by a lower layer in the bitmap. Optionally, "0" is assigned to a position corresponding to a received PDCP SDU that fails to be decompressed; and "1" is assigned to positions corresponding to other PDCP SDUs.

Some of the embodiments of the present disclosure take the dual-connection as an example. However, the technical solutions of the present disclosure are not limited thereto; and one skilled in the art could easily extend the technical solutions to a multi-connection scenario.

The technical solution of transmitting a UE multi-connection transmission capability between a base station and UE according to the first exemplary embodiment of the present disclosure is described below in detail with reference to FIG. 5 to FIG. 9.

Figure 5:
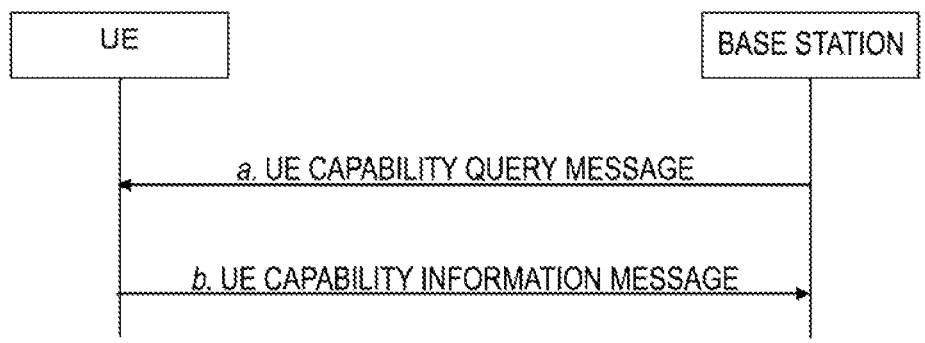
FIG. 5 illustrates a schematic signal flow diagram of transmitting a UE multi-connection transmission capability between a base station and UE according to a first exemplary embodiment of the present invention.

FIG. 5 illustrates a schematic signal flow diagram of transmitting a UE multi-connection transmission capability between a base station and UE according to a first exemplary embodiment of the present invention;

As shown in FIG. 5, in signaling a, the base station sends to the UE a UE capability query message; the message is used to request transmitting a wireless access capability of the UE when accessing the E-UTRAN and/or 5G-RAN and/or other radio access technologies (RATs). In signaling b, the base station receives the UE capability information message from the UE. The UE capability information message is used to transmit the UE wireless access capability under the request of the E-UTRAN and/or 5G-RAN.

Figure 6:
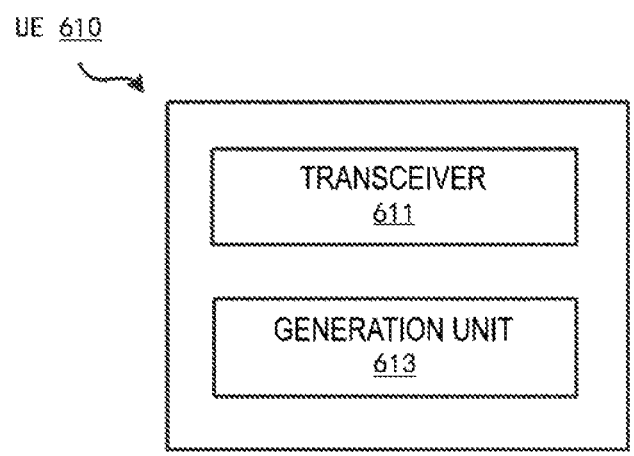
FIG. 6 illustrates a schematic structural block diagram of the UE according to the first exemplary embodiment of the present invention.

FIG. 6 illustrates a schematic structural block diagram of the UE according to the first exemplary embodiment of the present invention; As shown in FIG. 6, a UE 610 includes a transceiver 611 and a generation unit 613. Those skilled in the art should understand that only the transceiver 611 and the generation unit 613 related to the present invention are shown in the UE 610 of FIG. 2 to avoid confusion. Those skilled in the art should understand that although not shown in FIG. 6, the UE according to the embodiment of the present invention further includes other units that constitute the UE.

The transceiver 611 is configured to receive the UE capability query message from the base station; the UE capability query message is used to request the UE to send a wireless access capability of the UE for accessing an access network.

The generation unit 613 is configured to generate the UE capability information message in response to the received UE capability query message; the UE capability information message is used to indicate the wireless access capability of the UE for accessing the access network; and the UE capability information message includes bearer types and/or transmission manners supported by the UE.

The transceiver 611 is further configured to send the UE capability information message to the base station.

Figure 7:
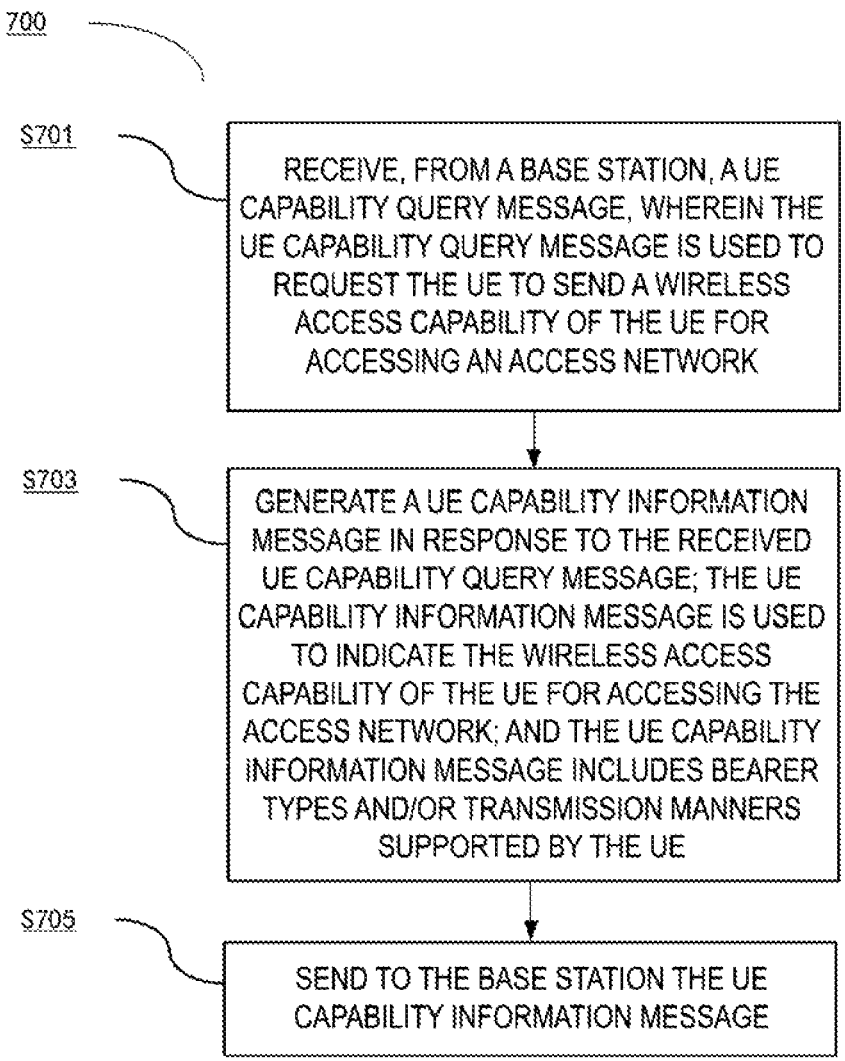
FIG. 7 illustrates a flowchart of a method executed at the UE for reporting the UE multi-connection transmission capability according to the first exemplary embodiment of the present invention.

FIG. 7 illustrates a flowchart of a method executed at the UE for reporting the UE multi-connection transmission capability according to the first exemplary embodiment of the present invention.

As shown in FIG. 7, a method 700 includes steps S701-S705, which can be executed by the UE 610 in FIG. 6.

Specifically, in step S701, the transceiver 611 of the UE 610 receives the UE capability query message from the base station; the UE capability query message is used to request the UE to send the wireless access capability of the UE for accessing the access network.

In step S703, the generation unit 612 of the UE 610 generates the UE capability information message in response to the received UE capability query message; the UE capability information message is used to indicate the wireless access capability of the UE for accessing the access network; and the UE capability information message includes bearer types and/or transmission manners supported by the UE.

In step S705, the transceiver 611 of the UE 610 sends the UE capability information message to the base station.

Figure 8:
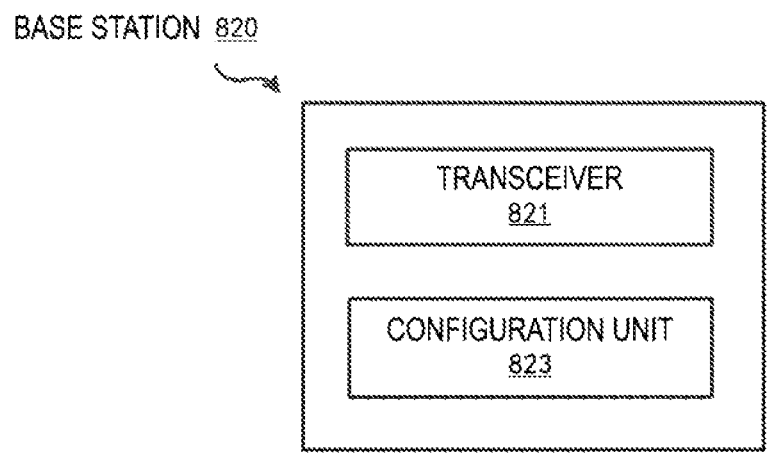
FIG. 8 illustrates a schematic structural block diagram of a base station according to the first and the second exemplary embodiments of the present invention.

FIG. 8 illustrates a schematic structural block diagram of a base station according to the first exemplary embodiment of the present invention; As shown in FIG. 8, a base station 820 includes: a transceiver 821 and a configuration unit 823. Those skilled in the art should understand that only the transceiver 821 and the configuration unit 823 related to the present invention are shown in the base station 820 of FIG. 8 to avoid confusion. Those skilled in the art should understand that although not shown in FIG. 8, the base station according to the embodiment of the present invention further includes other units that constitute the base station.

The transceiver 821 is configured to: send to the UE the UE capability query message; the UE capability query message is used to request the UE to send the wireless access capability of the UE for accessing the access network; and receive, from the UE, the UE capability information message; the UE capability information message is used to indicate the wireless access capability of the UE for accessing the access network and includes the bearer types and/or transmission manners supported by the UE.

The configuration unit 823 is configured to: configure for the UE a bearer type and/or transmission manner used for multi-connection transmission according to the UE capability information message.

Figure 9:
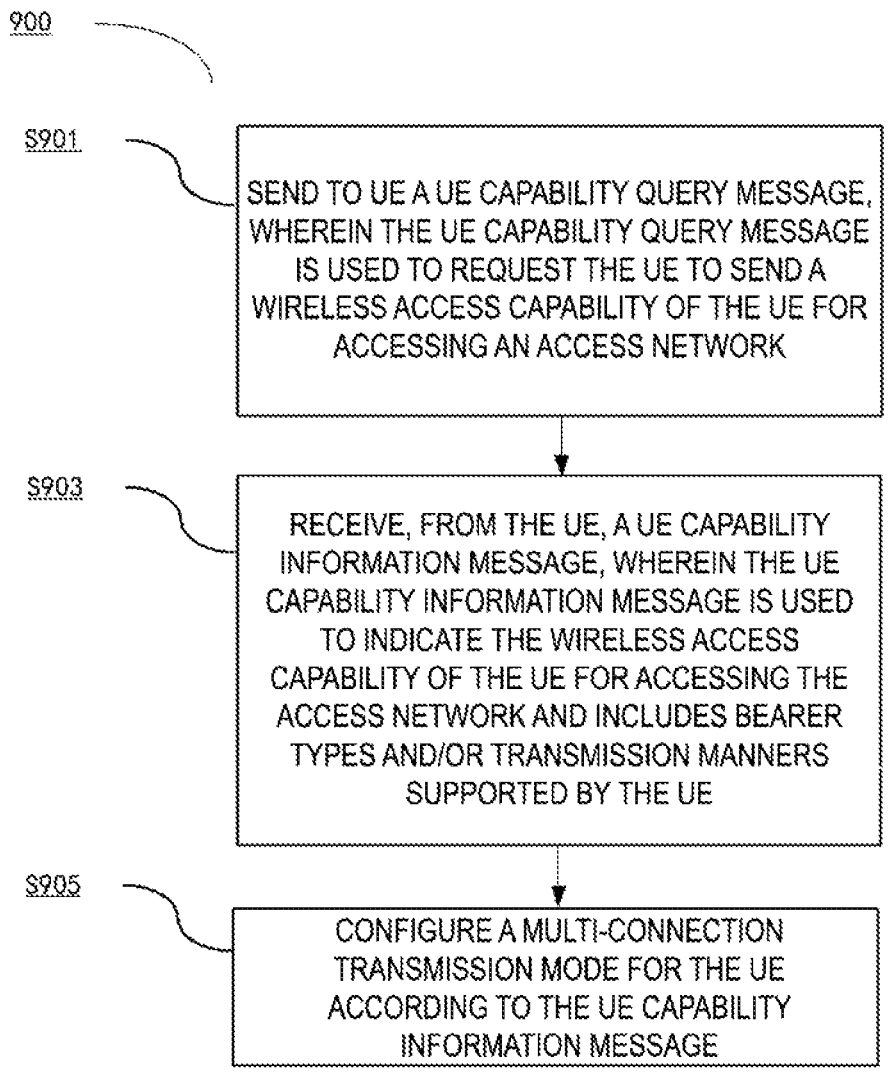
FIG. 9 illustrates a flowchart of a method executed at the base station for receiving the UE multi-connection transmission capability according to the first exemplary embodiment of the present invention.

FIG. 9 illustrates a flowchart of a method executed at the base station for receiving the UE multi-connection transmission capability according to the first exemplary embodiment of the present invention.

As shown in FIG. 9, a method 900 includes steps S901-S905, which can be executed by the base station 820 shown in FIG. 8.

Specifically, in step S901, the transceiver 821 of the base station 820 sends the UE capability query message to the UE; the UE capability query message is used to request the UE to send the wireless access capability of the UE for accessing the access network.

In step S903, the transceiver 821 of the base station 820 receives, from the UE, the UE capability information message; the UE capability information message is used to indicate the wireless access capability of the UE for accessing the access network and includes the bearer types and/or transmission manners supported by the UE.

In step S905, the configuration unit 823 of the base station 820 configures for the UE the bearer type and/or transmission manner used for multi-connection transmission according to the UE capability information message.

In one embodiment, the UE reports the supported bearer types and transmission manners according to any combination manner of a bearer type and a transmission manner supported by an E-UTRAN and/or a 5G-RAN systems in a multi-connection manner. The bearer types supported by the E-UTRAN and/or 5G-RAN systems include at least one of the following: a split bearer and an SCG bearer; and the transmission manners supported by the E-UTRAN and/or 5G-RAN systems include at least one of the following: data duplication and link selection. Correspondingly, the bearer types supported by the UE can include at least one of the split bearer and the SCG bearer; and the transmission manners supported by the UE can include at least one of the data duplication and the link selection.

In one implementation, the bearer types and/or transmission manners supported by the UE can be indicated by at least one information element; each information element indicates whether the UE supports one of the following combinations of the bearer types and the transmission manners in the uplink and/or downlink: split bearer with data duplication, split bearer with link selection, SCG bearer with data duplication, and SCG bearer with link selection.

For example, if the UE supports the split bearer with data duplication and/or the SCG bearer with data duplication, the UE capability information message indicates that the UE supports the split bearer with data duplication and/or the SCG bearer with data duplication; or if the UE supports the split bearer with link selection and the SCG bearer with link selection, the UE capability information message indicates that the UE supports the split bearer with link selection and the SCG bearer with link selection. For example, if the UE supports the split bearer with data duplication (or the SCG bearer data duplication), a corresponding information element value is set to "supported," "1," or "TRUE," which means that the UE supports the split bearer with data duplication (or the SCG bearer with data duplication) in the uplink and/or downlink; or if the UE supports the split bearer with link selection (or the SCG bearer with link selection), a corresponding information element value is set to "supported," "1," or "TRUE," which means that the UE supports the split bearer with link selection (or the SCG bearer with link selection) in the uplink and/or downlink. A descriptive example of the information element is provided below:

```
Multi-Connecticity-Parameter ::=    SEQUENCE {
    drb-TypeSplitDuplicate          ENUMERATED (supported)    OPTIONAL,
    drb-TypeSplitLinkSelection      ENUMERATED (supported)    OPTIONAL,
    drb-TypeSCGDuplicate            ENUMERATED (supported)    OPTIONAL,
    drb-TypeSCGLinkSelection        ENUMERATED (supported)    OPTIONAL,
}
```

Optionally, the split bearer with data duplication corresponds only to the uplink or the downlink. If the bearer is applicable only to the downlink, an information element can be defined and used to indicate whether the UE supports uplink PDCP data split of the split bearer with data duplication; or if the configuration is applicable only to the downlink, an information element can be defined and used to indicate whether the UE supports downlink PDCP data split of the split bearer with data duplication.

Optionally, the split bearer with link selection corresponds only to the uplink or the downlink. If the bearer is applicable only to the downlink, an information element can be defined and used to indicate whether the UE supports uplink PDCP data split of the split bearer with link selection; or if the configuration is applicable only to the uplink, an information element can be defined and used to indicate whether the UE supports downlink PDCP data split of the split bearer with link selection.

In another implementation, the bearer types and/or transmission manners supported by the UE can be indicated by at least one information element; each information element corresponds to one bearer type (the split bearer or the SCG bearer; there can be one or more bearers of the same bearer type), which is used to indicate whether the corresponding bearer type supports the data duplication or the link selection. In other words, the bearer types supported by the UE can include one or more of the following types: the split bearer and the SCG bearer. An information element is respectively associated with or defined for each bearer type; and the information element is used to indicate whether the corresponding bearer type supports the data duplication or the link selection.

For example, if the UE supports a split bearer (or an SCG bearer) in a data duplication mode, a corresponding information element value is set to "duplicate," "1," "0," "setup," "supported," or "TRUE"; or if the information element does not appear, it means that the corresponding split bearer (or SCG bearer) supports data sending in a data duplication manner. If the UE supports a split bearer (or an SCG bearer) in a link selection mode, a corresponding information element value is set to "link-selection," "1," "0," "setup," "supported," or "TRUE"; or if the information element does not appear, it means that the corresponding split bearer (or SCG bearer) supports data sending in a link selection manner. A descriptive example of the information element is provided below:

Optionally, the split bearer corresponds only to the uplink or the downlink. If the bearer type is applicable only to the downlink, an information element can be defined and used to indicate whether the UE supports uplink PDCP data split of the bearer; or if the configuration is applicable only to the uplink, an information element can be defined and used to indicate whether the UE supports downlink PDCP data split of the bearer.

Similarly, in another implementation, the bearer types and/or transmission manners supported by the UE can be indicated by at least one information element; each information element corresponds to one transmission manner and is used to indicate whether the corresponding transmission manner supports the split bearer or the SCG bearer.

In another implementation, the bearer types and/or transmission manners supported by the UE can be indicated by two information elements; the two information elements correspond to one bearer type and are respectively used to indicate the data duplication or the link selection supported by the corresponding bearer type. In other words, the bearer types supported by the UE can include one or more of the following: the split bearer and the SCG bearer. Two information elements are respectively associated with or defined for each bearer type, and the information elements are respectively used to indicate whether a corresponding bearer supports the data duplication or the link selection.

For example, if the UE supports a split bearer (or an SCG bearer) in a data duplication mode, a corresponding information element value is set to "duplicate," "1," "setup," "supported," or "TRUE". Or, if the UE supports a split bearer (or an SCG bearer) in a link selection mode, a corresponding information element value is set to "link-selection," "1," "setup," "supported," or "TRUE." Three descriptive examples of the information element are provided below:

```
Multi-Connecticity-Parameters ::=    SEQUENCE {
    drb-TypeSplit            ENUMERATED (supported)       OPTIONAL,
    split-Mode               ENUMERATED (duplicate, link-selection)
    OPTIONAL,
    drb-TypeSCG              ENUMERATED (supported)       OPTIONAL,
    scg-Mode                 ENUMERATED ( duplicate, lin-slection )
    OPTIONAL,
}
```

Example 1

```
Multi-Connecticity-Parameters ::=        SEQUENCE {
    Split-Parameters                     split-Parameters        OPTIONAL,
    SCG-parameters                       scg-Parameters          OPTIONAL,
}
Split-Parameters ::=                     SEQUENCE {
    drb-TypeSplit                        ENUMERATED (supported)  OPTIONAL,
    split-ModeDuplicate                  ENUMERATED (supported)  OPTIONAL,
    split-ModeLinkSelection              ENUMERATED (supported)  OPTIONAL,
}
SCG-Parameters ::=                       SEQUENCE {
    drb-TypeSCG                          ENUMERATED (supported)  OPTIONAL,
    SCG-ModeDuplicate                    ENUMERATED (supported)  OPTIONAL,
    SCG-ModeLinkSelection                ENUMERATED (supported)  OPTIONAL,
}
```

Example 2

```
Multi-Connecticity-Parameters ::=        SEQUENCE {
    Split-Parameters                     split-Parameters        OPTIONAL,
    SCG-parameters                       scg-Parameters          OPTIONAL,
}
Split-Parameters ::=                     SEQUENCE {
    split-ModeDuplicate                  ENUMERATED (supported)  OPTIONAL,
    split-ModeLinkSelection              ENUMERATED (supported)  OPTIONAL,
}
SCG-Parameters ::=                       SEQUENCE {
    SCG-ModeDuplicate                    ENUMERATED (supported)  OPTIONAL,
    SCG-ModeLinkSelection                ENUMERATED (supported)  OPTIONAL,
}
```

Example 3

```
Multi-Connecticity-Parameters ::=        SEQUENCE {
    drb-TypeSplit                        ENUMERATED (supported)  OPTIONAL,
    split-Mode-Duplicate                 ENUMERATED (supported)  OPTIONAL,
    split-ModeLinkSelection              ENUMERATED (supported)  OPTIONAL,
    drb-TypeSCG                          ENUMERATED (supported)  OPTIONAL,
    SCG-ModeDuplicate                    ENUMERATED (supported)  OPTIONAL,
    SCG-ModeLinkSelection                ENUMERATED (supported)  OPTIONAL,
}
```

Optionally, the split bearer corresponds only to the uplink or the downlink. If the bearer type is applicable only to the downlink, an information element can be defined and used to indicate whether the UE supports uplink PDCP data split of the bearer; or if the configuration is applicable only to the uplink, an information element can be defined and used to indicate whether the UE supports downlink PDCP data split of the bearer.

Similarly, in another implementation, the bearer types and/or transmission manners supported by the UE can be indicated by two information elements; the two information elements correspond to one transmission manner and are used to indicate whether the corresponding transmission manner supports the split bearer or the SCG bearer.

The technical solution of transmitting UE multi-connection transmission configuration information between a base station and UE according to the second exemplary embodiment of the present disclosure is described below in detail with reference to FIG. 8 and FIG. 10 to FIG. 12.

Figure 10:
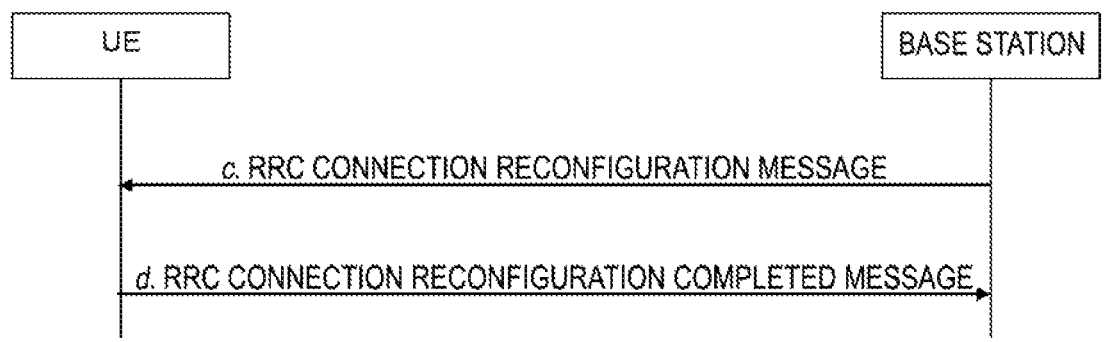
FIG. 10 illustrates a schematic signal flow diagram of transmitting UE multi-connection transmission configuration information between a base station and UE according to a second exemplary embodiment of the present invention.

As shown in FIG. 10, in signaling c, the base station sends an RRC connection reconfiguration message to the UE; the message is used to modify an RRC connection and includes bearer types and/or transmission manners the base station configures for the UE. In signaling d, the base station receives an RRC connection reconfiguration completed message from the UE; the message is used to confirm a success of the RRC connection reconfiguration.

Figure 11:
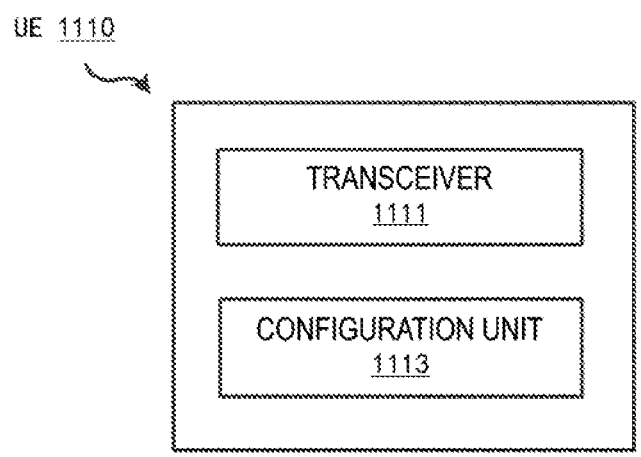
FIG. 11 illustrates a schematic structural block diagram of the UE according to the second exemplary embodiment of the present invention.

FIG. 11 illustrates a schematic structural block diagram of the UE according to the second exemplary embodiment of the present invention. As shown in FIG. 11, UE 1110 includes a transceiver 1111 and a configuration unit 1113. Those skilled in the art should understand that only the transceiver 1111 and the configuration unit 1113 related to the present invention are shown in the UE 1110 of FIG. 11 to avoid confusion. Those skilled in the art should understand that although not shown in FIG. 11, the UE according to the embodiment of the present invention further includes other units that constitute the UE.

The transceiver 1111 is configured to receive the RRC connection reconfiguration message from the base station; the RRC connection reconfiguration message is used to modify the RRC connection and includes the bearer type and/or transmission manner the base station configures for the UE.

The configuration unit 1113 is configured to perform the RRC connection reconfiguration according to the received RRC connection reconfiguration message; the RRC connection reconfiguration includes configuring the bearer type and/or transmission manner the UE uses for multi-connection transmission.

The transceiver 1111 is further configured to send the RRC connection reconfiguration completed message to the base station; the RRC connection reconfiguration completed message is used to confirm a success of the RRC connection reconfiguration.

Figure 12:
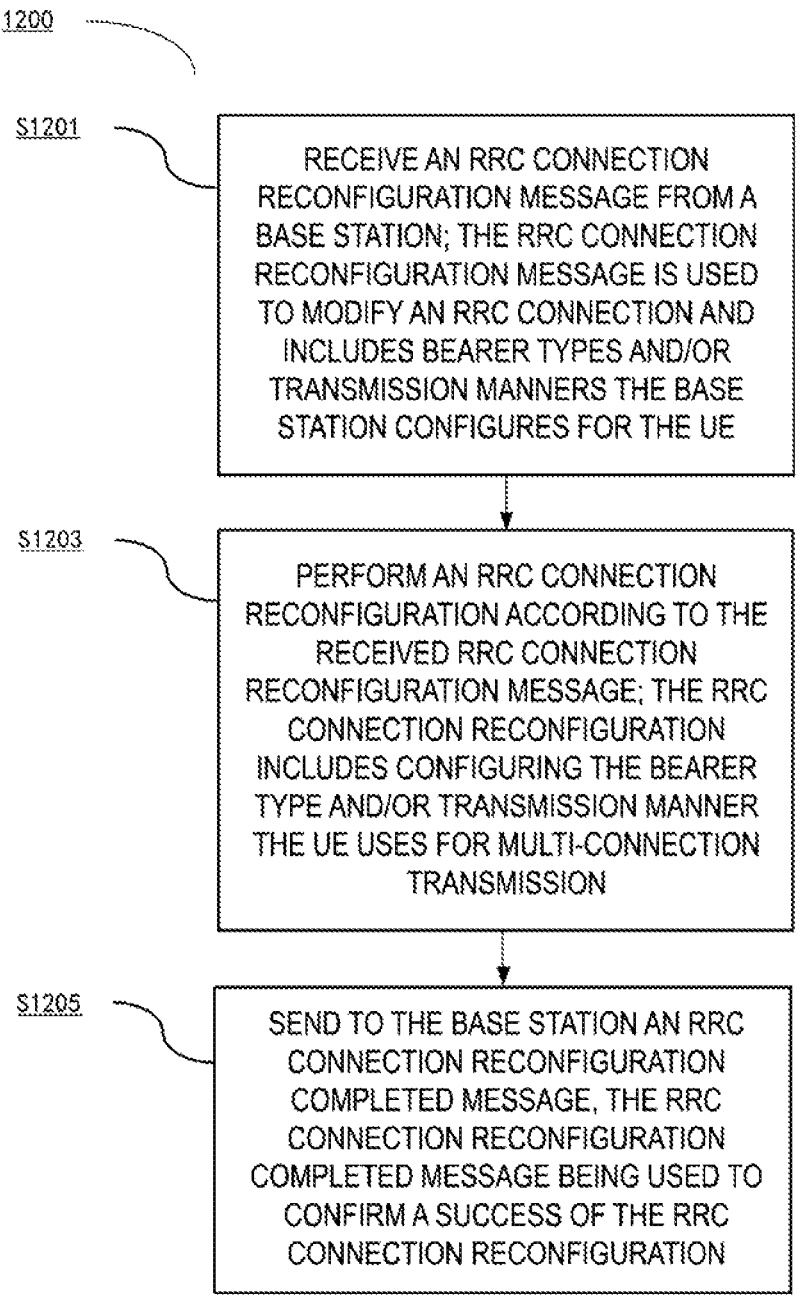
FIG. 12 illustrates a flowchart of a method executed at the UE for transmitting the UE multi-connection transmission configuration information according to the second exemplary embodiment of the present invention.

FIG. 12 illustrates a flowchart of a method executed at the UE for transmitting the UE multi-connection transmission configuration information according to the second exemplary embodiment of the present invention.

As shown in FIG. 12, a method 1200 includes steps S1201-S1205, which can be executed by the UE 1110 in FIG. 11.

Specifically, in step S1201, the transceiver 1111 of the UE 1110 receives, from a base station, a radio resource control (RRC) connection reconfiguration message, the RRC connection reconfiguration message being used to modify an RRC connection and comprising bearer types and/or transmission manners the base station configures for the UE.

In step S1203, the configuration unit 1113 of the UE 1110 performs the RRC connection reconfiguration according to the received RRC connection reconfiguration message; the RRC connection reconfiguration includes configuring the bearer type and/or transmission manner the UE uses for multi-connection transmission.

In step S1203, the transceiver 1111 of the UE 1110 sends to the base station an RRC connection reconfiguration completed message, the RRC connection reconfiguration completed message being used to confirm the successful completion of an RRC connection reconfiguration.

FIG. 8 illustrates a schematic structural block diagram of a base station according to the second exemplary embodiment of the present invention. As shown in FIG. 8, a base station 820 includes: a transceiver 821 and a configuration unit 823. Those skilled in the art should understand that only the transceiver 821 and the configuration unit 823 related to the present invention are shown in the base station 820 of FIG. 8 to avoid confusion. Those skilled in the art should understand that although not shown in FIG. 8, the base station according to the embodiment of the present invention further includes other units that constitute the base station.

The configuration unit 823 is configured to: configure for the UE the bearer type and/or transmission manner used for multi-connection transmission.

The transceiver 821 is configured to: send to the UE the RRC connection reconfiguration message, the RRC connection reconfiguration message being used to modify an RRC connection and comprising the configured bearer type and/or transmission manner; and to receive, from the UE, the RRC connection reconfiguration completed message, the RRC connection reconfiguration completed message being used to confirm a success of an RRC connection reconfiguration.

Figure 13:
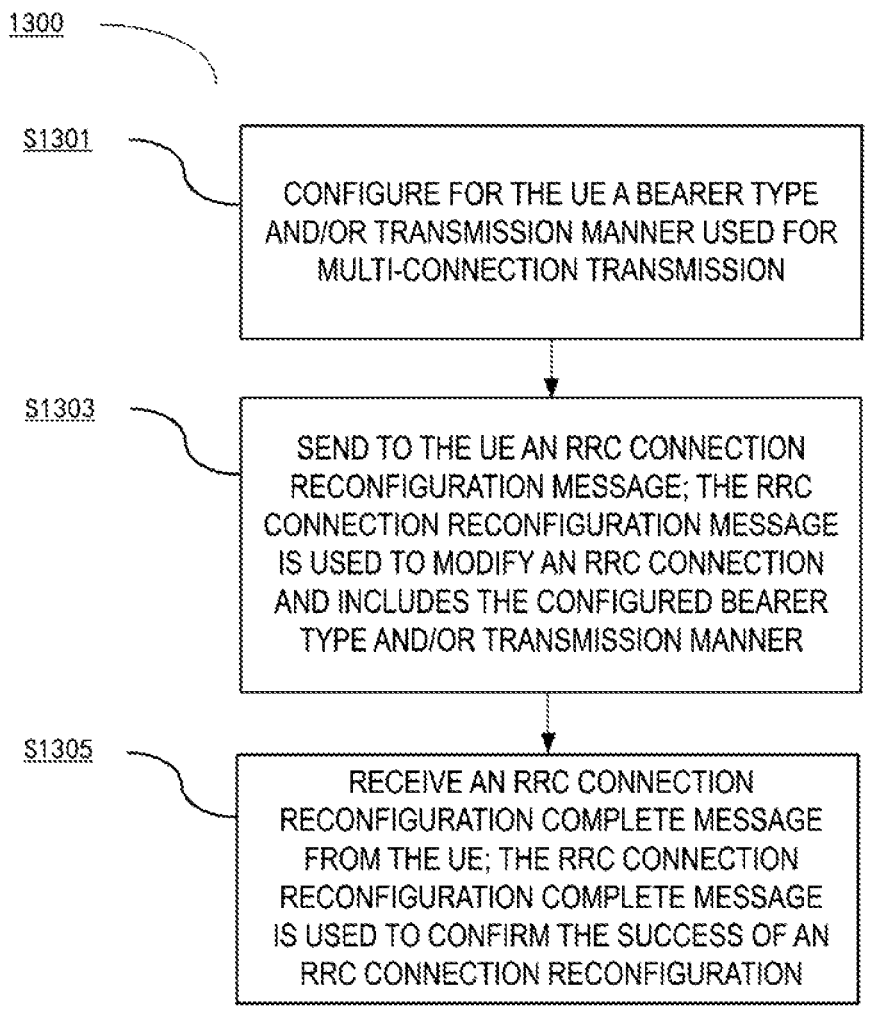
FIG. 13 illustrates a flowchart of a method executed at the base station for configuring a UE multi-connection transmission manner according to the second exemplary embodiment of the present invention.

FIG. 13 illustrates a flowchart of a method executed at the base station for configuring a UE multi-connection transmission manner according to the second exemplary embodiment of the present invention.

As shown in FIG. 13, a method 1300 includes steps S1301-S1305, which can be executed by the base station 820 shown in FIG. 8.

Specifically, in step S1301, the configuration unit 823 of the base station 820 configures for the UE the bearer type and/or transmission manner used for multi-connection transmission.

In step S1303, the transceiver 821 of the base station 820 sends the RRC connection reconfiguration message to the UE: the RRC connection reconfiguration message is used to modify an RRC connection and includes the configured bearer type and/or transmission manner.

In step S1305, the transceiver 821 of the base station 820 receives the RRC connection reconfiguration completed message from the UE: the RRC connection reconfiguration completed message is used to confirm the success of the RRC connection reconfiguration.

In one implementation, the RRC connection reconfiguration message may include at least one of the following combinations of the bearer types and the transmission manners: split bearer with data duplication; split bearer with link selection; SCG bearer with data duplication; and SCG bearer with link selection.

In another implementation, the RRC connection reconfiguration message comprises at least one bearer type and an information element used to indicate whether the corresponding bearer type supports the data duplication or the link selection.

In another implementation, the RRC connection reconfiguration message comprises at least one transmission manner and an information element used to indicate whether the corresponding transmission manner supports the split bearer or the SCG bearer.

In another implementation, the RRC connection reconfiguration message includes at least one bearer type and an information element used to indicate the data duplication or the link selection supported by the configured at least one bearer type; that is, an information element is defined for all bearers in the RRC connection reconfiguration message; the information element is used to indicate the data duplication or the link selection supported by all of the configured bearers.

In another implementation, the RRC connection reconfiguration message includes at least one transmission manner and an information element used to indicate the split bearer or the SCG bearer supported by the configured at least one transmission manner.

In one embodiment, the base station (E-UTRAN or 5G-RAN) can configure, according to combination manners reported by the UE in the multi-connection manner and of the bearer types and the transmission manners supported by the UE, one or more of the combination manners for the UE.

In one implementation, the combination manners of the bearer type and the transmission manner supported by the UE can include one or more of the following: split bearer with data duplication; split bearer with link selection; SCG bearer with data duplication; and SCG bearer with link selection. The type of each bearer the base station configures for the UE can be one of the following: split bearer with data duplication; split bearer with link selection; SCG bearer with data duplication; and SCG bearer with link selection. For details, reference can be made to bearer configuration manners in the dual-connection manner defined by the Long Term Evolution (LTE). A descriptive example of the information element is provided below:

```
DRB-ToAddModSCG ::= SEQUENCE {
    drb-Identity              DRB-Identity,
    drb-Type                  CHOICE {
        splitDuplicate            NULL,
        splitLinkselection        NULL,
        scgDuplicate              SEQUENCE {
```

-continued

```
        eps-BearerIdentity      INTEGER (0..15)       OPTIONAL,      -- Cond DRB-Setup
        pdcp-Config             PDCP-Config           OPTIONAL       -- Cond PDCP-S
      }
      scgLinkSelection          SEQUENCE {
        eps-BearerIdentity      INTEGER (0..15)       OPTIONAL,      -- Cond DRB-Setup
        pdcp-Config             PDCP-Config           OPTIONAL       -- Cond DRB-S
      }
    }                                                 OPTIONAL,      -- Cond SetupS2
    rlc-ConfigSCG               RLC-Config            OPTIONAL,      -- Cond SetupS
    rlc-Config                  RLC-Config-v1250      OPTIONAL,         -- Need ON
    logicalChannelIdentitySCG   INTEGER (3..10)       OPTIONAL,      -- Cond DRB-SetupS
    logicalChannelConfigSCG     LogicalChannelConfig  OPTIONAL,      -- Cond SetupS
    ...
}
```

Optionally, the configured split bearer with data duplication (or split bearer with link selection) corresponds only to the uplink or the downlink. If the configuration is applicable only to the downlink, an information element can be defined and used to indicate whether uplink PDCP data split of the split bearer with data duplication (or split bearer link selection) is supported; or if the configuration is applicable only to the uplink, an information element can be defined and used to indicate whether downlink PDCP data split of the split bearer with data duplication (or split bearer link selection) is supported.

In another implementation, the base station configures one or more bearer types (for example, the information element drb-Type in the descriptive example) for the UE and configures a transmission manner adopted by a corresponding bearer to the data duplication or the link selection (for example, the information element drb-Mode in the descriptive example) according to the bearer type supported and reported by the UE in the multi-connection manner. The type of each bearer configured by the base station (E-UTRAN or 5G-RAN) for the UE can be one of the split bearer and the SCG bearer. A descriptive example of the information element is provided below:

Optionally, the split bearer corresponds only to the uplink or the downlink. If the configuration is applicable only to the downlink, an information element can be defined and used to indicate whether uplink PDCP data split of the split bearer is supported; or if the configuration is applicable only to the uplink, an information element can be defined and used to indicate whether downlink PDCP data split of the split bearer is supported.

In another embodiment, the base station configures one or more bearers (for example, bearers contained in the information element drb-ToAddModListSCG) for the UE and configures a transmission manner adopted by the multi-connection bearer to be the data duplication or the link selection according to the bearer type supported and reported by the UE in the multi-connection manner; the configured transmission manner is applicable to all of the multi-connection bearers (for example, the information element scg-Mode in the descriptive example). The type of each bearer configured by the base station (E-UTRAN or 5G-RAN) for the UE can be one of the split bearer and the SCG bearer. A descriptive example of the information element I in this embodiment is provided below:

```
DRB-ToAddModSCG ::= SEQUENCE {
    drb-Identity                DRB-Identity,
    drb-Type                    CHOICE {// configuring bearer types
        split                   NULL,
        scg                     SEQUENCE {
            eps-BearerIdentity          INTEGER (0..15)       OPTIONAL,      -- Cond DRB-Setup
            pdcp-Config                 PDCP-Config           OPTIONAL       -- Cond PDCP-S
        }
    }
    drb-Mode                    CHOICE {//configuring a transmission manner corresponding to a bearer
        duplicate                   NULL,
        linkSelection               NULL
    }
    }                                                         OPTIONAL,      -- Cond SetupS2
    rlc-ConfigSCG               RLC-Config                    OPTIONAL,      -- Cond SetupS
    rlc-Config                  RLC-Config-v1250              OPTIONAL,         -- Need ON
    logicalChannelIdentitySCG   INTEGER (3..10)               OPTIONAL,      -- Cond DRB-SetupS
    logicalChannelConfigSCG     LogicalChannelConfig          OPTIONAL,      -- Cond SetupS
    ...
}
```

```
RadioResourceConfigDedicatedSCG ::=     SEQUENCE {
    drb-ToAddModListSCG                 DRB-ToAddModListSCG         OPTIONAL,   -- Need ON
    scg-Mode                            CHOICE {// configuring a transmission manner corresponding to all bearers
        duplicate                           NULL,
        linkSelection                       NULL
    }
}
    mac-MainConfigSCG                   MAC-MainConfig              OPTIONAL,   -- Need ON
    rlf-TimersAndConstantsSCG           RLF-TimerAndConstantSCG-r12 OPTIONAL,   -- Need ON
    ...
}
DRB-ToAddModSCG-r12 ::= SEQUENCE {
    drb-Identity-r12                    DRB-Identity,
    drb-Type-r12                        CHOICE {
        split-r12                           NULL,
        scg-r12                             SEQUENCE {
            eps-BearerIdentity-r12              INTEGER (0..15)     OPTIONAL,   -- Cond   DRB-Setup
            pdcp-Config-r12                     PDCP-Config         OPTIONAL    -- Cond   PDCP-S
        }
    }                                                               OPTIONAL,   -- Cond   SetupS2
    rlc-ConfigSCG-r12                   RLC-Config                  OPTIONAL,   -- Cond   SetupS
    rlc-Config-v1250                        RLC-Config-v1250        OPTIONAL,   -- Need ON
    logicalChannelIdentitySCG-r12       INTEGER (3..10)             OPTIONAL,   -- Cond   DRB-SetupS
    logicalChannelConfigSCG-r12         LogicalChannelConfig        OPTIONAL,   -- Cond   SetupS
    ...
}
```

Optionally, the split bearer corresponds only to the uplink or the downlink. If the configuration is applicable only to the downlink, an information element can be defined and used to indicate whether uplink PDCP data split of the split bearer is supported; or if the configuration is applicable only to the uplink, an information element can be defined and used to indicate whether downlink PDCP data split of the split bearer is supported.

The technical solution of preventing sending successfully received data executed at the UE according to the third exemplary embodiment of the present disclosure is described in detail in what follows.

In what follows, the situations where uplink transmission and downlink transmission are performed when UE adopts a data duplicate multi-connection transmission manner according to the third exemplary embodiment of the present disclosure are described respectively.

Uplink Transmission

Please refer to FIG. 1 (because the uplink transmission is described herein, a data transmission direction thereof should be opposite to the arrow direction in FIG. 1). The UE includes at least one PDCP entity; each PDCP entity is associated with at least one lower layer entity, namely, an RLC entity. In the example shown in FIG. 1, a PDCP entity and RLC entities (for example, three RLC entities, not for limitation yet) marked with black thick lines are associated; and a PDCP entity and RLC entities marked with thin lines are associated.

In the uplink transmission, a method executed by the UE in the data duplicate multi-connection transmission manner for preventing resending data that is confirmed to be successfully delivery includes:

the PDCP entity encapsulating at least one PDCP SDU into a PDCP PDU and submitting the PDCP SDU to at least one lower layer entity associated with the PDCP entity; and the PDCP entity deleting the successfully delivered PDCP SDU and the PDCP PDU corresponding thereto when receiving, from the at least one lower layer entity, a confirmation notification of successfully delivering of the PDCP SDU.

if the corresponding PDCP PDU is submitted to at least one other lower layer entity in the at least one lower layer entity, indicating the at least one other lower layer entity to discard the corresponding PDCP PDU through the PDCP entity.

Specifically, uplink data PDCP SDU of the UE is submitted to multiple lower layer entities (that is, the RLC entities) after being encapsulated by the PDCP entity; the multiple lower layer entities are some or all RLC entities (that is, the multiple RLC entities to which the PDCP entity is associated) in RLC entities involved by a split bearer adopting duplicate data transmission (i.e., split bearer data duplication). If an RLC entity receives a PDCP PDU (or referred to as RLC SDU) from the PDCP entity and the PDCP PDU is successfully delivered, the RLC entity notifies an upper layer (a PDCP layer) that the PDCP PDU is successfully delivered. When the PDCP entity of the UE receives, from one of the RLC entities (referred to as the first RLC entity), a notification of successfully delivering PDCP SDU, the PDCP entity indicates other RLC entities to discard the successfully delivered PDCP PDU (or RLC SDU). The other RLC entities are RLC entities involved with a split bearer adopting duplicate data transmission in multi-connection or the split bearer data duplication, or RLC entities of a successfully delivered PDCP PDU received by the PDCP entity, excluding the first RLC entity. In other words, when a lower layer entity (an RLC entity) confirms that a PDCP SDU is successfully delivered, the UE should discard the PDCP SDU and a corresponding PDCP PDU. If the PDCP PDU is submitted to other lower layers (RLC layers), other lower layer entities are notified of the discard information; that is, other lower layer entities are indicated to discard the PDCP PDU. The other RLC entities are RLC entities involved with a split bearer adopting duplication data transmission in multi-connection or the split bearer data duplication, or RLC entities received the successfully delivered PDCP PDU from the PDCP entity, excluding the first RLC entity.

Downlink Transmission

In the downlink transmission, a method executed by the UE in the data duplicate multi-connection transmission manner for preventing resending data that is confirmed to be successfully delivered includes:

a PDCP entity receiving at least one PDCP SDU or PDCP PDU from at least one lower layer entity (namely, RLC entity) associated with the PDCP entity; and when confirming that a PDCP SDU is successfully received, the PDCP entity notifying at least one other RLC entity in the at least one RLC entity that the PDCP SDU or PDCP PDU is successfully received.

If one of the at least one other RLC entity does not successfully receive, from a base station, the successfully received PDCP SDU or PDCP PDU, the other RLC entity indicates an equivalent entity in the base station not to perform retransmission.

If one of the at least one other RLC entity likewise successfully receives the successfully received PDCP SDU or PDCP PDU, the other RLC entity discards the PDCP SDU or PDCP PDU.

Specifically, when the UE receives downlink data, if the PDCP entity successfully receives, from a lower layer entity (namely, RLC entity), a PDCP SDU or PDCP PDU, the PDCP entity notifies other lower layer entities (that is, RLC entities) that the PDCP PDU (namely, RLC SDU) is successfully received. If one of the other lower layer entities does not successfully receive the RLC SDU indicated to be successfully received or a section thereof, the other lower layer entity can indicate an equivalent entity not to retransmit the RLC SDU or the section thereof; that is, an RLC state PDU do not contain the RLC SDU or the section thereof. If one of the other lower layer entities successfully receives the PDCP PDU or a section thereof, one of the other lower layer entities does not deliver the PDCP PDU or the section thereof to an upper layer (a PDCP layer), namely, deleting the PDCP PDU or the section thereof.

The technical solution of preventing sending successfully received data executed at a base station in downlink transmission in a data duplicate multi-connection transmission manner according to the fourth exemplary embodiment of the present disclosure is described below with reference to FIG. 14 to FIG. 16.

Figure 14:
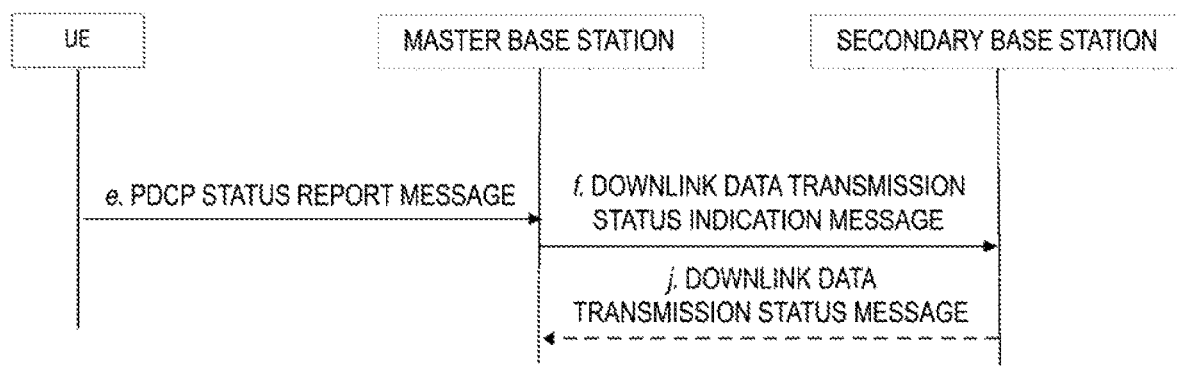
FIG. 14 illustrates a schematic signal flow diagram of a Packet Data Convergence Protocol (PDCP) status report being transmitted between a base station and UE and a downlink data transmission status indication being transmitted between base stations according to a fourth exemplary embodiment of the present invention.

FIG. 14 illustrates a schematic signal flow diagram of transmitting a PDCP status report between a base station and UE and transmitting a downlink data transmission status indication between base stations according to the fourth exemplary embodiment of the present invention.

As shown in FIG. 14, in signaling e, the base station (or MeNB or MCG) receives a PDCP status report from the UE; the PDCP status report is used to indicate to the base station that the UE has received a PDCP protocol data unit (PDU) successfully. In signaling f, a master base station sends a downlink data transmission status indication message to a secondary base station, so as to indicate to the secondary base station that the UE has received the PDCP PDU successfully.

Figure 15:
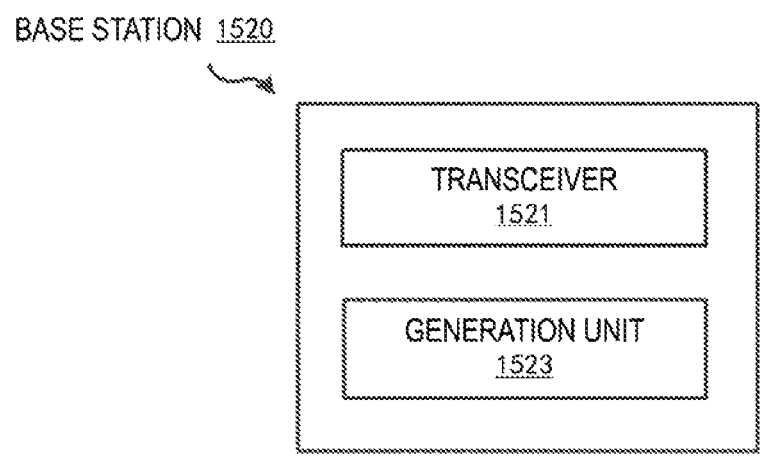
FIG. 15 illustrates a schematic structural block diagram of a base station according to the fourth and a fifth exemplary embodiments of the present invention.

FIG. 15 illustrates a schematic structural block diagram of a base station according to the fourth exemplary embodiment of the present invention. As shown in FIG. 15, a base station 1520 includes a transceiver 1521 and a generation unit 1523. Those skilled in the art should understand that only the transceiver 1521 and the generation unit 1523 related to the present invention are shown in the base station 1520 of FIG. 15 to avoid confusion. Those skilled in the art should understand that although not shown in FIG. 15, the base station according to the embodiment of the present invention further includes other units that constitute the base station.

In the fourth embodiment, the transceiver 1521 is configured to receive a PDCP status report from the UE; the PDCP status report is used to indicate to the base station that the UE has received a PDCP PDU successfully.

The generation unit, 1523 is configured to generate a downlink data transmission status indication message according to the received PDCP status report, the downlink data transmission status indication message being used to indicate to at least one other base station the PDCP PDU that the UE successfully receives;

The transceiver 1521 is further configured to send the downlink data transmission status indication message to the at least one other base station.

Figure 16:
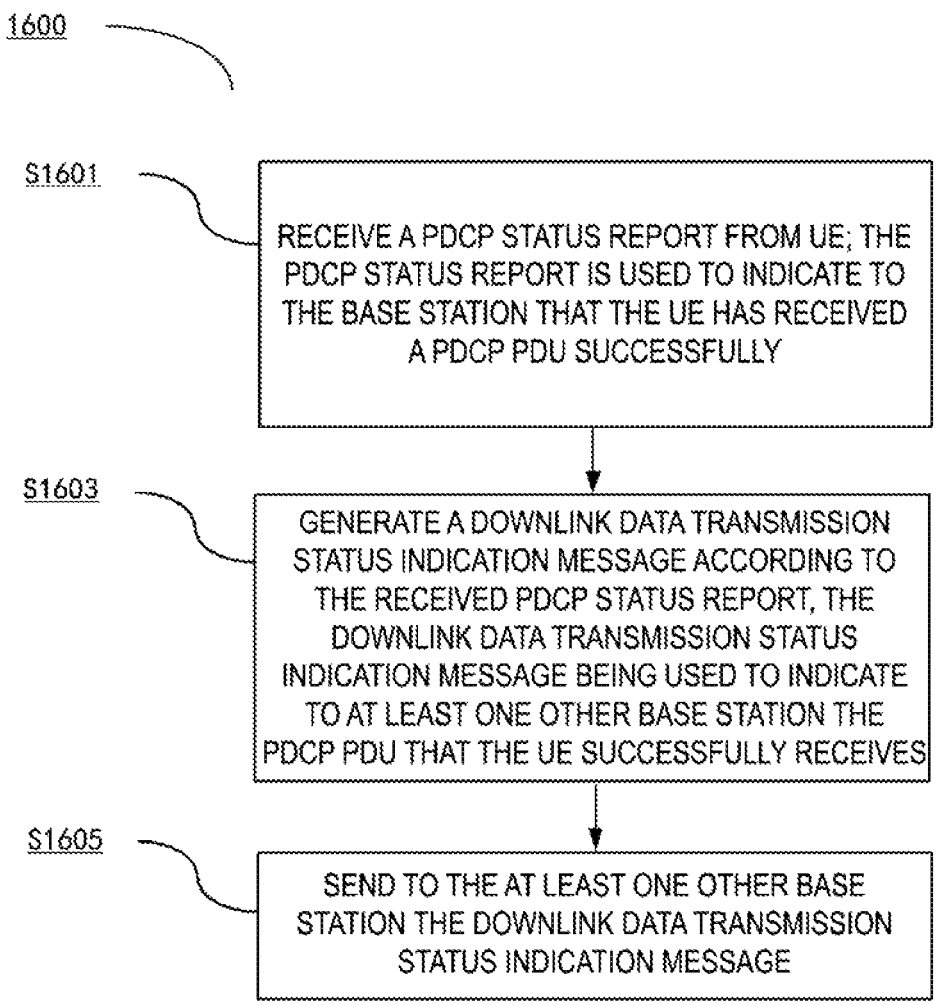
FIG. 16 illustrates a flowchart of a method executed at the base station for preventing sending successfully-received data according to the fourth exemplary embodiment of the present invention.

FIG. 16 illustrates a flowchart of a method executed at the base station for preventing sending successfully-received data according to the fourth exemplary embodiment of the present invention.

As shown in FIG. 16, a method 1600 includes steps S1601-S1605, which can be executed by the base station 1520 shown in FIG. 15.

Specifically, in step S1601, the transceiver 1521 of the base station 1520 receives the PDCP status report from the UE; the PDCP status report is used to indicate to the base station that the UE has received a PDCP protocol data unit (PDU) successfully.

In step S1603, the generation unit 1523 of the base station 1520 generates a downlink data transmission status indication message according to the received PDCP status report, the downlink data transmission status indication message being used to indicate to at least one other base station the PDCP PDU that the UE successfully receives.

In step S1605, the transceiver 1521 of the base station 1520 sends the downlink data transmission status indication message to the at least one other base station (secondary base station).

Optionally, the method 1600 may include the following steps (not shown):

the transceiver 1521 of the base station 1520 sends an RRC connection reconfiguration message to the UE; the message includes a parameter or an information element used for configuring a period for the UE for sending the PDCP status report; and the transceiver 1521 of the base station 1520 receives an RRC connection reconfiguration completed message from the UE.

At the UE, when a PDCP status report condition is triggered, for example, when an upper layer (or a base station) polling is received or a status report timer expires, the status report timer is used by the UE for triggering a status report for a multi-connection bearer; and a value thereof can be configured by the base station via RRC signaling; a PDCP entity of the UE prepares the PDCP status report after processing PDCP PDUs received from different lower layer entities (that is, RLC entities), and delivers the status report as a first PDCP PDU to the lower layer entities for transmission.

In one embodiment, contents contained in the downlink data transmission status indication message are one or more fields contained in the PDCP status report. In this case, the master base station (MeNB) can send the status report received from the UE to the secondary base station (SeNB).

In another embodiment, the contents contained in the downlink data transmission status indication message are: a maximum PDCP PDU SN of successfully sent PDCP PDUs (namely, a maximum PDCP PDU SN of the PDCP PDUs successfully received by the UE) and PDCP PDU SNs of all non-successfully sent PDCP PDUs of which the sequence numbers thereof are less than the maximum PDCP PDU SN of the successfully sent PDCP PDUs (namely, PDCP PDU SNs of PDCP PDUs which are not confirmed to be successfully received by the UE and of which the sequence numbers thereof are less than the maximum PDCP PDU SN of the successfully received PDCP PDUs).

Optionally, the contents contained in the downlink data transmission status indication message are: a maximum PDCP PDU SN of all PDCP PDUs successfully sent by the base station (including the master base station and the secondary base station), and PDCP PDU SNs of all non-successfully sent PDCP PDUs of which the SNs thereof are less than the maximum SN of all of the PDCP PDUs that the base station successfully sends.

Optionally, the signal flow diagram shown in FIG. 14 further includes signaling j (marked by a dotted line). The secondary base station sends a downlink data transmission status message to the master base station; the downlink data transmission status message includes the following contents:

(a) a maximum sequence number (which can be referred to as a PDCP SN) of PDCP PDUs received from the master base station and successfully sequentially sent to the UE;

(b) an expected buffer size of a corresponding radio access bearer;

(c) a minimum expected buffer size for the UE; and (d) an Xn-U, Xx-U, or X2-U data packet that is considered, by the secondary base station, to be lost and that is excluded in a downlink data transmission status frame currently sent to the master base station.

In addition, when it is determined that a downlink user data transmission process ends, the downlink data transmission status message does not include (d).

It should be noted that signaling f and signaling j are performed without a particular order.

The technical solution of preventing sending successfully received data performed between base stations in downlink transmission in a data duplicate multi-connection transmission manner according to the fifth exemplary embodiment of the present disclosure is described below with reference to FIG. 15, FIG. 17, and FIG. 18.

Figure 17:
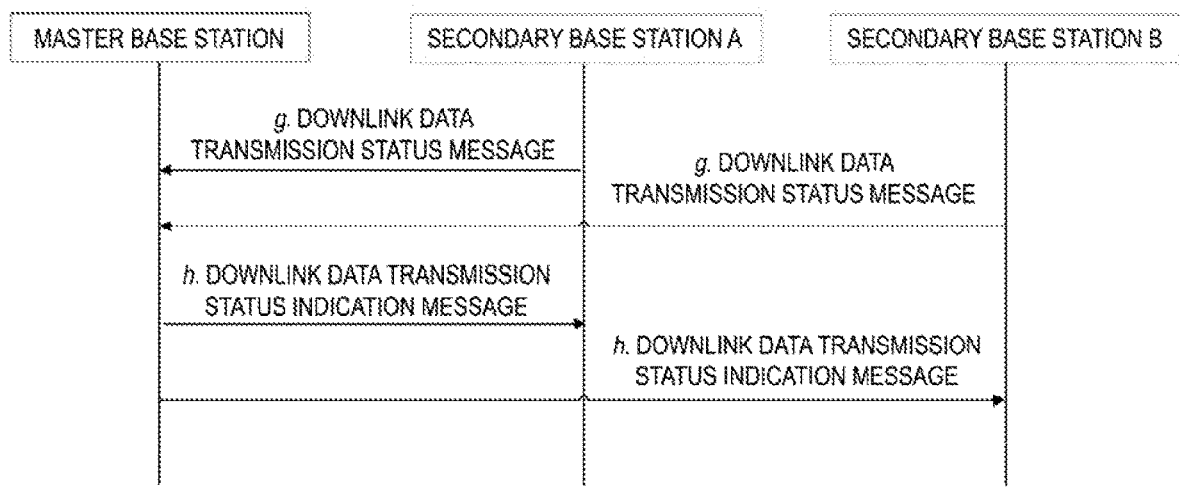
FIG. 17 illustrates a schematic signal flow diagram of a downlink data transmission status and a downlink data transmission status indication being transmitted between base stations according to the fifth exemplary embodiment of the present invention.

FIG. 17 illustrates a schematic signal flow diagram of a downlink data transmission status and a downlink data transmission status indication being transmitted between base stations according to the fifth exemplary embodiment of the present invention.

As shown in FIG. 17, in signaling g, a master base station receives a downlink data transmission status message from one or more secondary base stations. The message contains the following contents:

(a) a maximum sequence number (which can be referred to as a PDCP SN) of PDCP PDUs received from the master base station and successfully sequentially sent to the UE;

(b) an expected buffer size of a corresponding radio access bearer;

(c) a minimum expected buffer size for the UE; and (d) an Xn-U, Xx-U, or X2-U data packet that is considered, by the secondary base station, to be lost and that is excluded in a downlink data transmission status frame currently sent to the master base station.

In addition, when it is determined that a downlink user data transmission process ends, the downlink data transmission status message does not include (d).

In signaling h, the master base station sends a downlink data transmission status indication message to the one or more secondary base stations. In the case of a dual-connection situation, one secondary base station exists.

FIG. 15 illustrates a schematic structural block diagram of a base station according to the fifth exemplary embodiment of the present invention. As shown in FIG. 15, a base station 1520 includes a transceiver 1521 and a generation unit 1523. Those skilled in the art should understand that only the transceiver 1521 and the generation unit 1523 related to the present invention are shown in the base station 1520 of FIG. 15 to avoid confusion. Those skilled in the art should understand that although not shown in FIG. 15, the base station according to the embodiment of the present invention further includes other units that constitute the base station.

In the fifth embodiment, the transceiver 1521 is configured to: send to at least one other base station a PDCP PDU; receive, from the at least one other base station, a downlink data transmission status message, the downlink data transmission status message being used to indicate a maximum sequence number of PDCP PDUs received from the base station and successfully sequentially sent to the UE, an expected buffer size of a corresponding radio access bearer, a minimum expected buffer size for the UE, and an Xn-U, Xx-U, or X2-U data packet that the at least one other base station considers to be lost and excluded in a downlink data transmission status frame that the base station sends.

The generation unit 1523 is configured to generate a downlink data transmission status indication message according to the received downlink data transmission status message, the downlink data transmission status indication message being used to indicate to the at least one other base station that UE successfully receives the PDCP PDU.

The transceiver 1521 is further configured to send the downlink data transmission status indication message to the at least one other base station.

Figure 18:
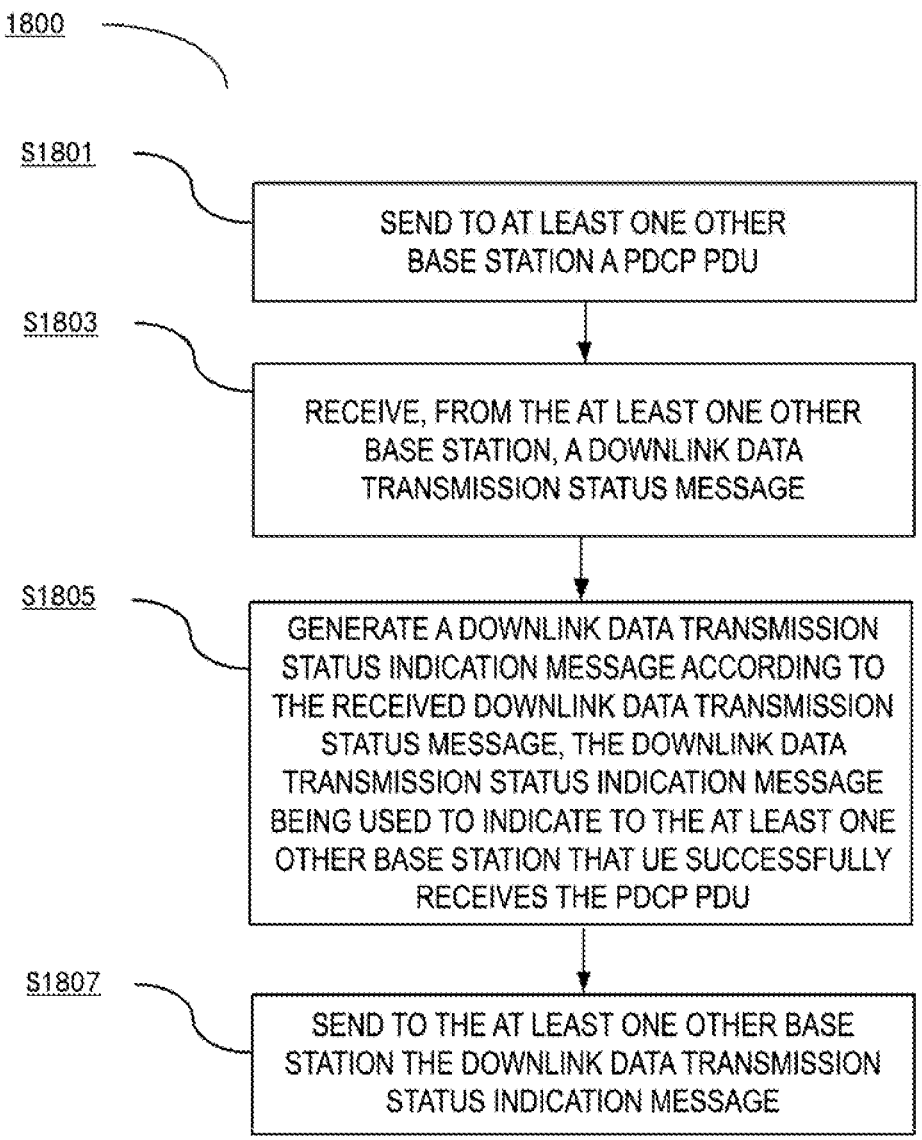
FIG. 18 illustrates a flowchart of a method executed between the base stations for preventing sending successfully-received data according to the fifth exemplary embodiment of the present invention.

FIG. 18 illustrates a flowchart of a method executed between the base stations for preventing sending successfully-received data according to the fifth exemplary embodiment of the present invention.

As shown in FIG. 18, a method 1800 includes steps S1801-S1807, which can be executed by the base station 1520 shown in FIG. 15.

Specifically, in step S1801, the transceiver 1521 of the base station 1520 sends a PDCP PDU to at least one other base station (secondary base station).

In step S1803, the transceiver 1521 of the base station 1520 receives, from the at least one other base station, the downlink data transmission status message, the downlink data transmission status message being used to indicate a maximum sequence number (SN) of PDCP PDUs received from the base station and successfully sequentially sent to the UE, an expected buffer size of a corresponding radio access bearer, a minimum expected buffer size for the UE, and an Xn-U, Xx-U, or X2-U data packet that the at least one other base station considers to be lost and excluded in a downlink data transmission status frame that the base station sends.

In step S1805, the generation unit 1523 of the base station 1520 generates the downlink data transmission status indication message according to the received downlink data transmission status message; the downlink data transmission status indication message is used to indicate to at least one other base station the PDCP PDU that the UE successfully receives.

In step S1807, the transceiver 1521 of the base station 1520 sends the downlink data transmission status indication message to the at least one other base station.

In one embodiment, contents contained in the downlink data transmission status indication message are one or more fields contained in the PDCP status report. In this case, the master base station (MeNB) can send the status report received from the UE to the secondary base station (SeNB).

In another embodiment, the contents contained in the downlink data transmission status indication message are: a maximum PDCP PDU SN of successfully sent PDCP PDUs (namely, a maximum PDCP PDU SN of the PDCP PDUs successfully received by the UE) and PDCP PDU SNs of all non-successfully sent PDCP PDUs of which the sequence numbers thereof are less than the maximum PDCP PDU SN of the successfully sent PDCP PDUs (namely, PDCP PDU SNs of PDCP PDUs which are not confirmed to be successfully received by the UE and of which the sequence numbers thereof are less than the maximum PDCP PDU SN of the successfully received PDCP PDUs).

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the embodiments above may be replaced with one another.

The invention claimed is:

1. A User Equipment (UE), comprising:
receiving circuitry configured to receive a radio resource control (RRC) reconfiguration message which includes a first indication used to indicate whether or not duplication is configured for a radio bearer with a Packet Data Convergence Protocol (PDCP) entity associated with more than one Radio Link Control (RLC) entity;
processing circuitry configured to configure the radio bearer based on the RRC reconfiguration message; and
transmitting circuitry configured to transmit an RRC Reconfiguration complete message which is used to confirm successful completion of an RRC connection reconfiguration;
wherein
in a case that the duplication is configured for the radio bearer, the processing circuitry is further configured to cause the PDCP entity of the radio bearer to:
submit respective PDCP protocol data units (PDUs), which are same as each other, to all of the more than one RLC entity, and
in response to the PDCP entity receiving, from one of the more than one RLC entity, a notification indicating that a corresponding one of the PDCP PDUs is successfully delivered by the one of the more than one RLC entity, indicate to all remaining one or more of the more than one RLC entity to discard respective one or more of the PDCP PDUs.

2. A method performed by a User Equipment (UE), comprising:
receiving a radio resource control (RRC) reconfiguration message which includes a first indication used to indicate whether or not duplication is configured for a radio bearer with a Packet Data Convergence Protocol (PDCP) entity associated with more than one Radio Link Control (RLC) entity;
configuring the radio bearer based on the RRC reconfiguration message;
transmitting an RRC Reconfiguration complete message which is used to confirm successful completion of an RRC connection reconfiguration; and
in a case that the duplication is configured for the radio bearer, causing the PDCP entity of the radio bearer to:
submit respective PDCP protocol data units (PDUs), which are the same as each other, to all of the more than one RLC entity, and
in response to the PDCP entity receiving, from one of the more than one RLC entity, a notification indicating that a corresponding one of the PDCP PDUs is successfully delivered by the one of the more than one RLC entity, indicate to all remaining one or more of the more than one RLC entity to discard respective one or more of the PDCP PDUs.

3. The UE of claim 1, wherein
the processing circuitry is further configured to cause the one of the more than one RLC entity to send the notification to the PDCP entity after confirming that the corresponding one of the PDCP PDUs is successfully delivered.

\* \* \* \* \*